United States Patent
Kato et al.

(10) Patent No.: US 7,889,604 B2
(45) Date of Patent: Feb. 15, 2011

(54) INFORMATION RECORDING MEDIUM, APPARATUS, AND METHOD, USING DUMMY DATA IN DUMMY DATA RECORDING AREA

(75) Inventors: Masahiro Kato, Saitama (JP); Tohru Kanegae, Saitama (JP); Kyusho Omori, Saitama (JP); Tatsuhiro Yone, Saitama (JP); Masahiro Miura, Saitama (JP); Eisaku Kawano, Saitama (JP)

(73) Assignee: Pioneer Corporation, Tokyo (JP)

( * ) Notice: Subject to any disclaimer, the term of this patent is extended or adjusted under 35 U.S.C. 154(b) by 427 days.

(21) Appl. No.: 12/065,154

(22) PCT Filed: Aug. 30, 2006

(86) PCT No.: PCT/JP2006/317061

§ 371 (c)(1),
(2), (4) Date: Feb. 28, 2008

(87) PCT Pub. No.: WO2007/026741

PCT Pub. Date: Mar. 8, 2007

(65) Prior Publication Data

US 2009/0257329 A1 Oct. 15, 2009

(30) Foreign Application Priority Data

Aug. 30, 2005 (JP) ............................. 2005-249602

(51) Int. Cl.
*G11B 21/08* (2006.01)
(52) U.S. Cl. .................... 369/30.04; 369/94; 369/275.3
(58) Field of Classification Search ....................... None
See application file for complete search history.

(56) References Cited

U.S. PATENT DOCUMENTS

2005/0030874 A1* 2/2005 Sasaki .......................... 369/94
2007/0076554 A1* 4/2007 Sasaki ...................... 369/53.24

FOREIGN PATENT DOCUMENTS

JP  2000-311346 A  11/2000
JP  2001-023237 A  1/2001

(Continued)

OTHER PUBLICATIONS

International Search Report of PCT/JP2006/317061 dated Dec. 5, 2006.

*Primary Examiner*—Paul Huber
(74) *Attorney, Agent, or Firm*—Young & Thompson

(57) ABSTRACT

An information recording medium is provided with: a first recording layer in which one portion of record information including predetermined data can be recorded, the predetermined data being (i) capable of setting a recording layer close to a physically or optically recorded state, and (ii) capable of setting the recording layer close to a buffer state for finalizing; and a second recording layer in which another portion of the record information can be recorded by laser light transmitted through the first recording layer, the information recording medium is provided with a management area in which management information can be recorded, the management information including (iii) identification information indicating whether or not there is a predetermined data recording area in which the predetermined data can be recorded, (iv) position information of the predetermined data recording area, and (v) attribute information of the predetermined data recording area.

8 Claims, 22 Drawing Sheets

FOREIGN PATENT DOCUMENTS

| | | |
|---|---|---|
| JP | 2005-025821 A | 1/2005 |
| JP | 2006-147117 A | 6/2006 |
| JP | 2006/080108 A1 | 8/2006 |
| JP | 2006-236483 A | 9/2006 |
| WO | 2006/080108 | 8/2006 |

* cited by examiner

50: Management information

| Content |
|---|
| Attribute information about DDA1 |
| Position information about DDA1 |
| Attribute information about DDA2 |
| Position information about DDA2 |
| : |
| Attribute information about DDA⌈n⌋ |
| Position information about DDA⌈n⌋ |

(b)

50a: DR information (in RMA)

| Data position | Content | Data amount (Bytes) |
|---|---|---|
| 0 | Attribute information about DDA1 | 1 |
| 1～4 | Start address of DDA1 | 4 |
| 5～8 | End address of DDA2 | 4 |
| 9 | Attribute information about DDA2 | 1 |
| 10～13 | Start address of DDA2 | 4 |
| 14～17 | End address of DDA2 | 4 |
| 18 | Attribute information about DDA3 | 1 |
| 19～22 | Start address of DDA3 | 4 |
| 23～26 | End address of DDA3 | 4 |
| 27 | Attribute information about DDA4 | 1 |
| 28～31 | Start address of DDA4 | 4 |
| 32～35 | End address of DDA4 | 4 |
| : | : | : |
| 1143 | Attribute information about DDA128 | 4 |
| 1144～1147 | Start address of DDA128 | 4 |
| 1148～1151 | End address of DDA128 | 4 |
| 1152～2047 | Spare | 896 |

FIG. 5

51:
Attribute information

| Bit pattern | Attribute |
|---|---|
| 0001 b / 01 h | Data area |
| 0010 b / 02 h | Lead-in area |
| 0100 b / 04 h | Lead-out area |
| 1000 b / 08 h | Middle area |

FIG. 7

50a: DR information

| | Data position | Content | Data amount (Bytes) |
|---|---|---|---|
| DDA1 | 0 | 08 h | 1 |
| | 1~4 | 0000 3000 h | 4 |
| | 5~8 | 0002 3778 h | 4 |
| DDA2 | 9 | 08 h | 1 |
| | 10~13 | 00FD C649 h | 4 |
| | 14~17 | 00FD D109 h | 4 |
| DDA3 | 18 | 01 h | 1 |
| | 19~22 | 00FD D10A h | 4 |
| | 23~26 | 00FF CC8F h | 4 |
| DDA4 | 27 | 04 h | 1 |
| | 28~31 | 00FF CC90 h | 4 |
| | 32~35 | 00FF D066 h | 4 |
| | : | : | : |
| | 1143 | 00 h | 4 |
| | 1144~1147 | 0000 0000 h | 4 |
| | 1148~1151 | 0000 0000 h | 4 |
| | 1152~2047 | All 0000 0000 h | 896 |

FIG. 8

50a: DR information

| Data position | Content | Data amount (Bytes) |
|---|---|---|
| 0 | 08 h | 1 |
| 1~4 | 0001 EF00 h | 4 |
| 5~8 | 0002 3778 h | 4 |
| 9 | 08 h | 1 |
| 10~13 | 00FD C649 h | 4 |
| 14~17 | 00FD D109 h | 4 |
| 18 | 01 h | 1 |
| 19~22 | 00FD D10A h | 4 |
| 23~26 | 00FE 10FF h | 4 |
| 18 | 01 h | 1 |
| 19~22 | 00FF 57E0 h | 4 |
| 23~26 | 00FF CC8F h | 4 |
| 27 | 04 h | 1 |
| 28~31 | 00FF CC90 h | 4 |
| 32~35 | 00FF D066 h | 4 |
| : | : | : |
| 1143 | 00 h | 4 |
| 1144~1147 | 0000 0000 h | 4 |
| 1148~1151 | 0000 0000 h | 4 |
| 1152~2047 | All 0000 0000 h | 896 |

DDA1-1: rows 0, 1~4, 5~8
DDA2: rows 9, 10~13, 14~17
DDA3-1: rows 18, 19~22, 23~26
DDA3-2: rows 18, 19~22, 23~26
DDA4: rows 27, 28~31, 32~35

50: Management information

| Content | |
|---|---|
| Identification information about L1 layer (details) | Identification information about L0 layer (details) |

(b)

50c: DR information (in CDZ)

| Data position | Content | Data amount (Bytes) |
|---|---|---|
| 0~43 | ... | ... |
| 44 | DR code (details) | 1 |
| 45~2047 | ... | ... |

(c)

51c: DR code

| Bit pattern | Content |
|---|---|
| 0000 0000 b | Dummy is not recorded in L0 layer |
| 0000 0001 b | Dummy is recorded with data area attribute in L0 layer |
| 0000 0010 b | Dummy is recorded with middle area attribute in L0 layer |
| 0000 0011 b | Dummy is recorded with lead-out area attribute in L0 layer |
| 0000 0000 b | Dummy is not recorded in L1 layer |
| 0000 0100 b | Dummy is recorded with data area attribute in L1 layer |
| 0000 1000 b | Dummy is recorded with middle area attribute in L1 layer |
| 0000 1100 b | Dummy is recorded with lead-out area attribute in L1 layer |

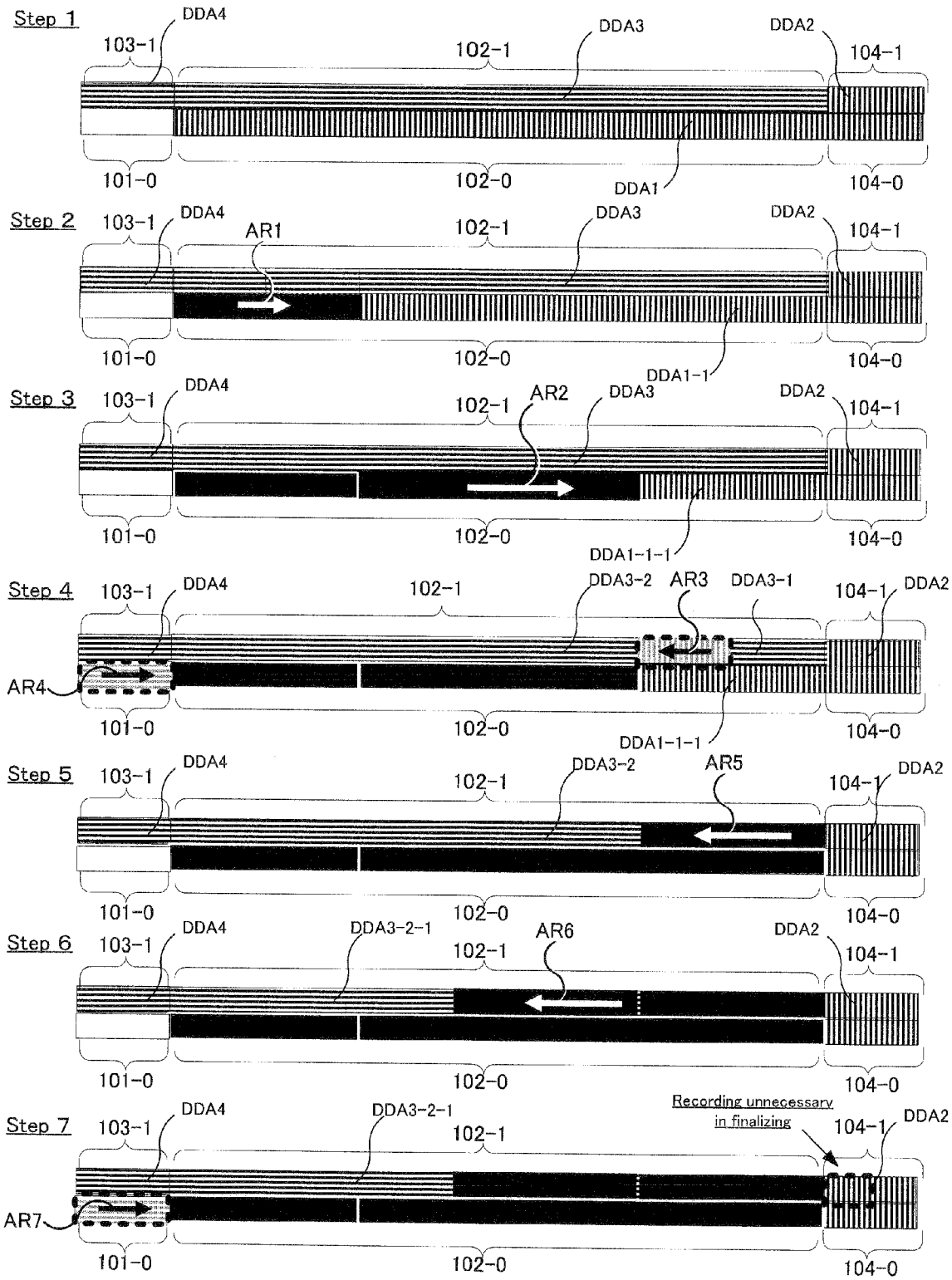

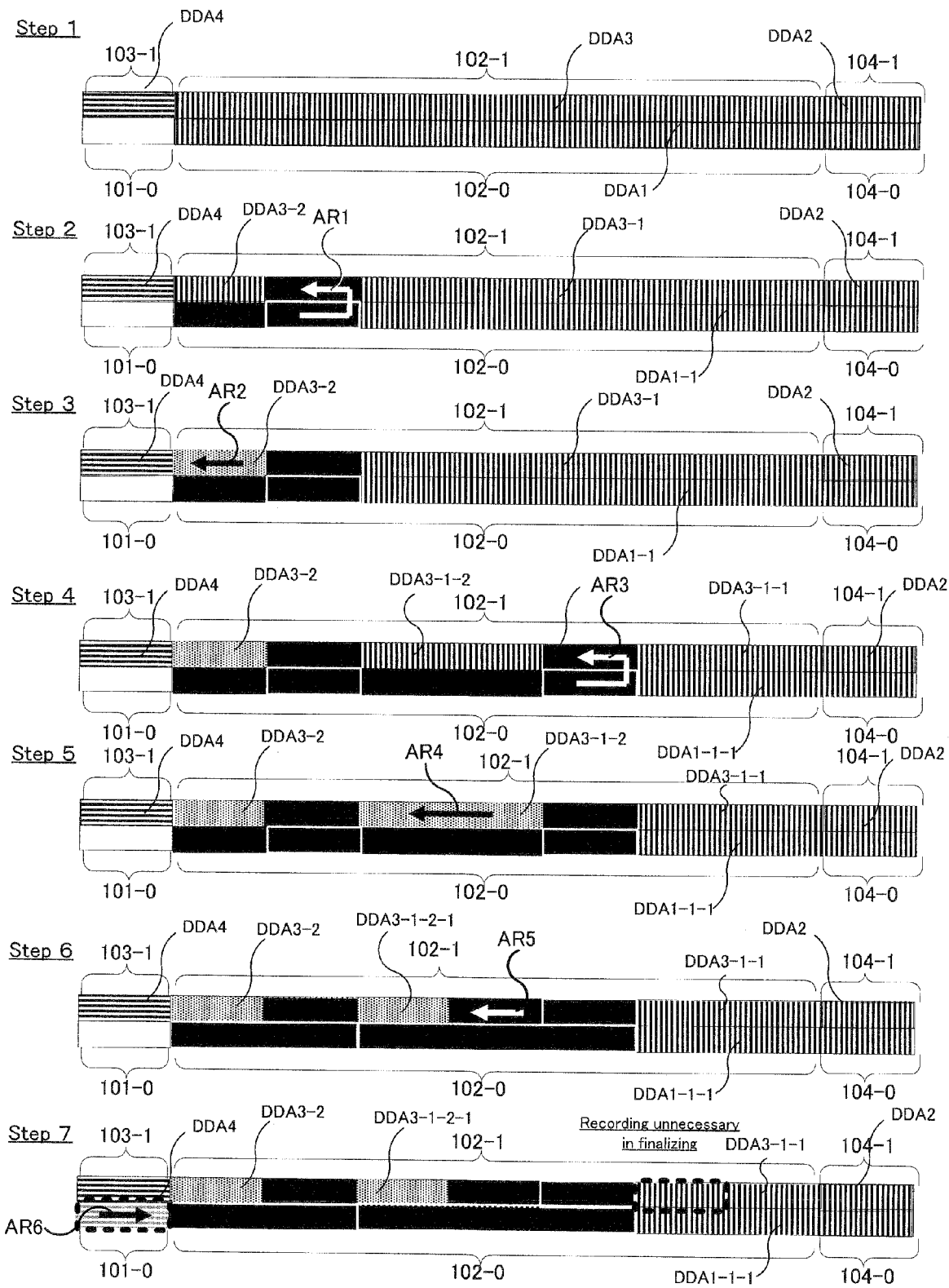

FIG. 21
Step 1
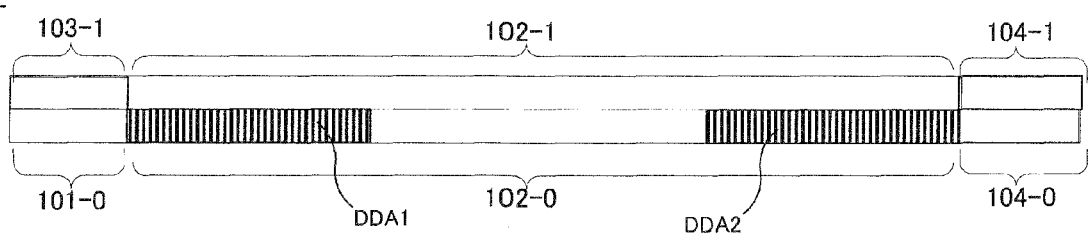
Step 2
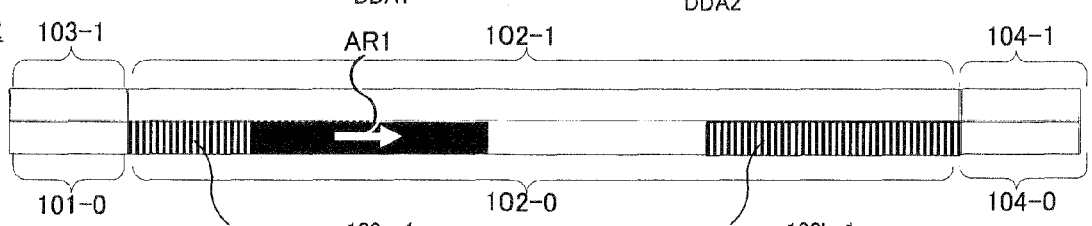
Step 3
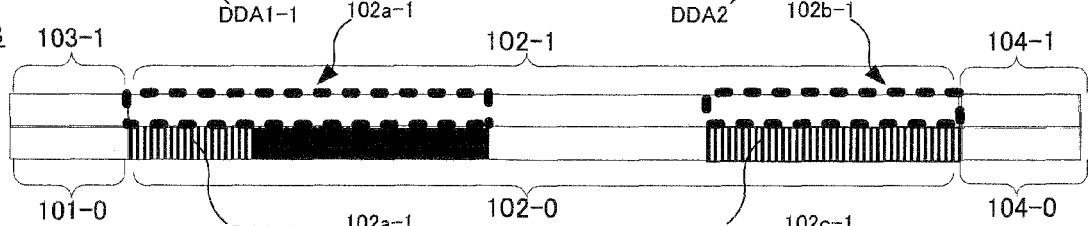
Step 4
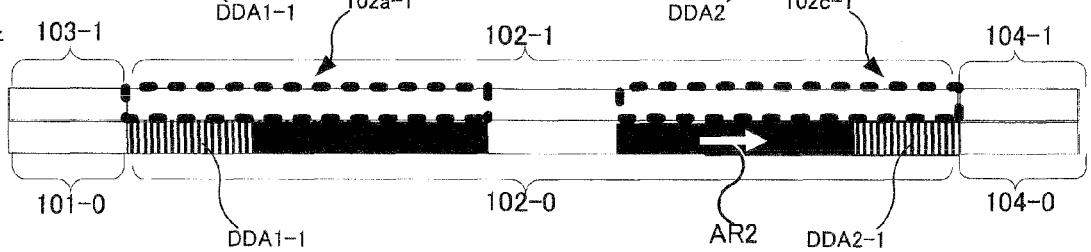

FIG. 22
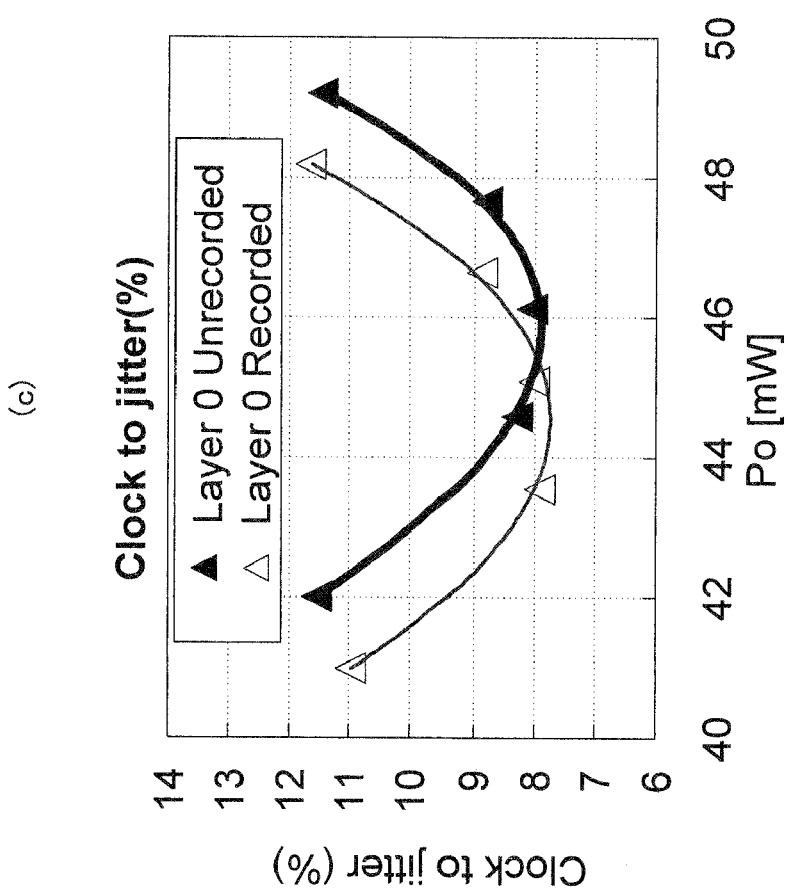
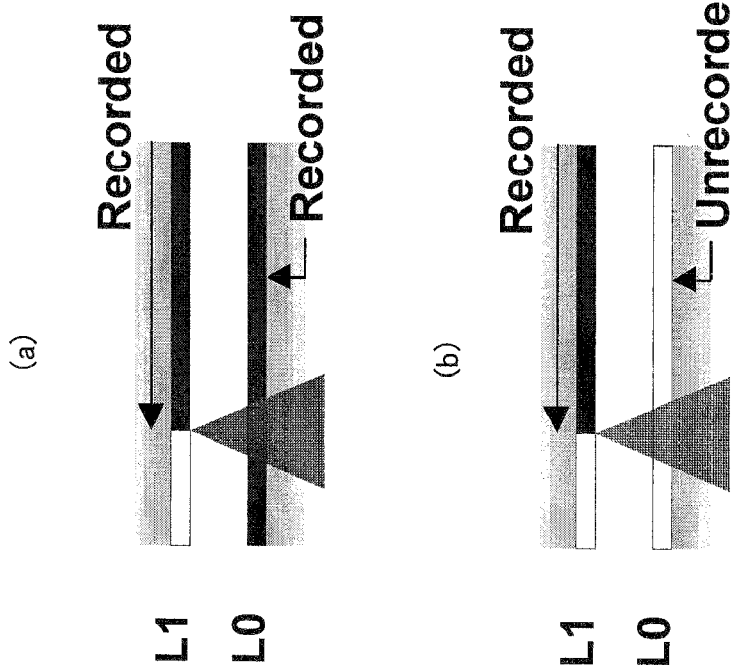

INFORMATION RECORDING MEDIUM, APPARATUS, AND METHOD, USING DUMMY DATA IN DUMMY DATA RECORDING AREA

This application is a 371 of PCT/JP2006/317061, filed Aug. 30, 2006.

TECHNICAL FIELD

The present invention relates to an information recording medium, such as an optical disc, like a DVD (Digital Versatile Disc), a BD (Blu-ray Disc), a CD (Compact Disc) or the like, on which recoding and reproduction can be performed by irradiating it with laser light, a recording apparatus and a recording method for the information recording medium, a reproducing apparatus and a reproducing method, and a computer program.

BACKGROUND ART

In an information recording medium of a recording type, such as a CD-R (Compact Disc-Recordable), a DVD-R, a DVD-RW, and a DVD+R, for example, as described in patent documents 1 and 2, etc., there is also developed an information recording medium, such as an optical disc, of a multilayer type or dual layer type or multiple layer type, in which a plurality of recording layers are laminated or stacked on the same substrate. Then, on an information recording apparatus, such as a DVD recorder, which performs recording with respect to the dual layer type, i.e., two-layer type optical disc, information is recorded in an irreversible change recording method by heat or the like, or in a rewritable method, into a recording layer located on the front (i.e. on the closer side to an optical pickup) viewed from a laser light irradiation side (hereinafter referred to as an "L0 layer", as occasion demands), by focusing the laser light for recording on the L0 layer. On the other hand, information is recorded in the irreversible change recording method by heat or the like, or in the rewritable method, into a recording layer located on the rear (i.e. on the farther side to the optical pickup) viewed from the laser light irradiation side (hereinafter referred to as an "L1 layer", as occasion demands), by focusing the laser light for recording on the L1 layer through the L0 layer.

When information is recorded into the L1 layer, which constitutes such a two-layer type optical disc, the optimum recording power of the laser light with which the L1 layer is irradiated through the recorded L0 layer, as shown in FIG. 22($a$), is 44.5 (mW: milliwatt) at which a jitter value is minimal on a parabolic curve in a thin line (with white triangles) in FIG. 22($c$), for example. On the other hand, the optimum recording power of the laser light with which the L1 layer is irradiated through the unrecorded L0 layer which has a different light transmittance from that of the recorded L0 layer, as shown in FIG. 22($b$), is 46 (mW: milliwatt) at which a jitter value is minimal on a parabolic curve in a thick line (with black triangles) in FIG. 22($c$), for example. Thus, there is a need to consider whether or not the L0 layer is recorded, in the case of the recording in the L1 layer. With respect to this, there is devised or invented a recording method in which a so-called recording order is satisfied, wherein the recording order is that the laser light for recording, transmitted through the recorded L0 layer, is to be irradiated, for example. On the other hand, with the L0 layer in an unrecorded state, information is recorded into the L1 layer, by the laser light holding an optimum recording power corresponding to the unrecorded L0 layer. Alternatively, it is judged whether or not an area in the L0 layer facing or opposed to an area scheduled to record therein information is recorded, on the basis of management information, such as a space bit map (SBM), for example. Then, on the basis of the judgment, the information is recorded into the L1 layer. The expression "facing or opposed to" in the present invention may mean that one portion of the first recording layer and one portion of the second recording layer correspond to and face each other, i.e. a position relationship in which they are in substantially the same radial position. Moreover, it may mean a position relationship after consideration of errors, such as an eccentricity.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

However, in the recording method in which the recording order is satisfied, in order to record the information into the recording area of the L1 layer, it is necessary to stop an effective recording operation by various processes, such as setting the L0 layer to the recorded state, for example. Therefore, there is a technical problem that a recording control process becomes complicate, causing a high load on the recording control process.

Alternatively, in the recording method in which the recording order is satisfied, it is necessary to dynamically change the optimum recording power of the laser light for recording the information into the recording area of the L1 layer, while it is judged whether or not the state of a recording area in the L0 layer facing to the recording area scheduled to record therein the information is recorded, on the basis of management information, such as the SBM, for example. Thus, there is a technical problem that a recording control process becomes complicate, causing a high load on the recording control process.

Moreover, alternatively, in the recording method in which the recording order is satisfied, generally, information is recorded firstly into the L0 layer, and after the information is recorded in the entire L0 layer, information is recorded into the L1 layer. Therefore, there likely arises the situation that the information is recorded in the entire L0 layer, whereas the information is recorded only in one portion of the L1 layer. In that situation, if a finalize process to enable reproduction of the optical disc is performed on an existing DVD-ROM player or the like, it is necessary to record dummy data into the L1 layer where the information is not recorded. Thus, there is such a technical problem that it takes more time for the finalize process, as compared to the size of the actually recorded information.

It is therefore an object of the present invention to provide an information recording medium, an information recording apparatus, an information recording method, an information reproducing apparatus, and an information reproducing method, which enable more efficient information recording and reduction in a recording time length, even with respect to the information recording medium having a plurality of recording layers, and a computer program which makes a computer function as the information recording apparatus and the information reproducing apparatus.

Means for Solving the Subject (Information Recording Medium)

Hereinafter, the information recording medium of the present invention will be explained.

The above object of the present invention can be achieved by an information recording medium, provided at least with: a first recording layer (L0 layer) in which one portion of record information including predetermined data can be recorded, the predetermined data being (i) capable of setting a recording layer close to a physically or optically recorded state, and (ii) capable of setting the recording layer close to a buffer state for finalizing (in which data is embedded or buried); and a second recording layer (L1 layer) in which another portion of the record information can be recorded by laser light transmitted through the first recording layer, at least one of the first recording layer and the second recording layer provided with a management area (RMA) in which management information (Dummy Recording information) can be recorded, the management information including at least one of (iii) identification information indicating whether or not there is a predetermined data recording area (dummy data area) in which the predetermined data can be recorded, (iv) position information as for a position of the predetermined data recording area, and (v) attribute information as for an attribute of the predetermined data recording area.

According to the information recording medium of the present invention, one portion of the record information is recorded along a first track, for example, which is formed in the first recording layer and from which address information, such as LPP (Land Pre Pits), and clock information can be read. Simultaneously or in tandem, another portion of the record information is recorded along a second track, for example, which is formed in the second recording layer and from which the address information, such as LPP, and the clock information can be read. Specifically, the first track may be directed from one side to the other out of the inner and outer circumferential sides of a disc-shaped substrate, for example, provided for the information recording medium, whereas the second track may be directed from the other side to the one side. Namely, in the two-layer type or multilayer type information recording medium, continuous recording can be performed in an "opposite method" in which the tracks for recording are oppositely directed between the two recording layers. Therefore, if the recording is continuously performed from the end edge of the first recording layer to the start edge of the second recording layer, it is hardly necessary or not necessary at all to change the irradiation position of laser light in the substrate surface, in the radial direction, in changing the recording layer as the target of a recording process or reproduction process related to the record information. Thus, it is possible to perform quick layer jump (i.e. a layer changing operation). This is extremely useful in practice, in the point that it facilitates uninterrupted reproduction without a special buffer function to change the recording layer, when the continuous record information, such as a movie, for example, is recorded.

Alternatively, the first track may be directed from one side to the other out of the above-mentioned inner and outer circumferential sides, and the second track may be also directed from the one side to the other, as in the first track. Namely, in the two-layer type or multilayer type information recording medium, continuous recording can be performed in a "parallel method" in which the tracks for recording are directed in the same direction between the two recording layers. In the parallel method, if the recording or reproduction is ended in the first recording layer, an optical pickup, located on the outermost circumference of an optical disc, for example, needs to be displaced again to the innermost circumference when the recording or reproduction is started in the second recording layer, so that it takes more time to change the recording layer from the first recording layer to the second recording layer, as compared to the above-mentioned opposite method.

Particularly in the present invention, in the first recording layer, such as the L0 layer, for example, one portion of the record information can be recorded, wherein the record information includes the predetermined data capable of setting the first recording layer close to the physically or optically recorded state. The expression "set . . . close to" (e.g., "A set . . . close to B") in the present invention may mean that they (e.g., A and B) are practical equivalent. Alternatively, the expression "set . . . close to" (e.g., "A set . . . close to B") may mean that a quantitative or qualitative difference between the both (e.g., both A and B) is small enough to be within a predetermined range, on the basis of various quantitative or qualitative parameters, for example.

On the other hand, in the second recording layer, such as the L1 layer, for example, another portion of the record information can be recorded by the laser light transmitted through the first recording layer. In addition, the management information, such as DR (Dummy Recording) information, for example, can be recorded in the management area, such as a recording management area, for example, provided for at least one of the first recording layer and the second recording layer. The management information includes at least one of (i) the identification information indicating whether or not there is a predetermined data recording area (e.g. a dummy data area) in which the predetermined data can be recorded, (ii) the position information as for a position of the predetermined data recording area, and (iii) the attribute information as for an attribute of the predetermined data recording area.

Therefore, it is possible to receive the following two effects.

As a first effect, it is possible to enable an information recording apparatus, such as a DVD recorder, for example, described later, to identify the recording position of the predetermined data capable of setting the first or second recording layer to the physically or optically recorded state, on the basis of the management information. Thus, in the recording operation performed by the information recording apparatus, it is possible to quickly and accurately record another portion of the record information into another recording area of the second recording layer facing one recording area of the first recording layer, while ensuring good quality. In other words, when another portion of the record information is recorded into the another recording area of the second recording layer, there is little or no chance to stop the effective recording operation by various processes, such as a recording process for recording the predetermined data or the record information, for example, into one recording area of the first recording layer, in order to satisfy the above-mentioned recording order. Moreover, it is also possible to realize random write, with the above-mentioned recording order satisfied, by a simple recording process, such as the recording control process by using a constant optimum recording power, for example. The random write in the present invention means that a user records arbitrary data into an arbitrary position in arbitrary timing, in the second recording layer, in addition to the first recording layer.

Consequently, it is possible to enable the information recording apparatus described later to perform the recording operation including the random write, for example, which satisfies the above-mentioned recording operation, more accurately and quickly, while preventing a high load on the recording control process.

Moreover, as a second effect, it is possible to enable the information recording apparatus described later to identify the recording position of the predetermined data capable of setting the first or second recording layer to the buffer state for finalizing, on the basis of the management information. Thus, in the finalize process performed by the information recording apparatus, it is hardly or not necessary at all to record padding data, which is mostly to set the area to the buffer state for the finalizing, for example. Therefore, in the finalize process performed on the information recording medium, it is possible to reduce the size of the recording area necessary to record therein the padding data, for example, or it is possible to almost or completely eliminate the recording area necessary to record therein the padding data.

As a result, a time length for the finalize process performed on the information recording medium is substantially the same as a recording time length of recording the effective record information, such as content information, for example. Thus, it is possible to realize great reduction and more efficient reduction in the time length for the finalize process, which enables the user to feel greater comfort in the finalize process.

In one aspect of the information recording medium of the present invention, the attribute of the predetermined data recording area is the same as that of any one of a lead-out area, a middle area, and a data area.

According to this aspect, it is possible to enable the information recording apparatus described later, to more accurately and quickly perform the recording operation including the random write, for example, which satisfies the above-mentioned recording operation, on the information recording medium provided with the predetermined data recording area holding various attributes, while preventing a high load on the recording control process. In addition, with respect to the information recording medium provided with the predetermined data recording area holding various attributes, a time length for the finalize process performed on the information recording medium is substantially the same as a recording time length of recording the effective record information, such as content information, for example. Thus, it is possible to realize great reduction and more efficient reduction in the time length for the finalize process.

In another aspect of the information recording medium of the present invention, the attribute of the predetermined data recording area is the same as that of the data area, and zero or a predetermined value (Null, etc.) can be recorded into the predetermined data recording area.

According to this aspect, with respect to the information recording medium provided with the predetermined data recording area which holds the attribute of the data area and in which zero or the predetermined value is recorded, a time length for the finalize process performed on the information recording medium is substantially the same as a recording time length of recording the effective record information, such as content information, for example. Thus, it is possible to realize great reduction and more efficient reduction in the time length for the finalize process.

In another aspect of the information recording medium of the present invention, the management information includes, as the position information, (i) a start address indicating a start position of the predetermined data recording area, and (ii-1) an end address indicating an end position of the predetermined data recording area or (ii-2) information as for a recording capacity of the predetermined data.

According to this aspect, it is possible to specify the position of the predetermined data recording area, highly accurately.

In another aspect of the information recording medium of the present invention, the management information includes at least one of the identification information, the position information, and the attribute information.

According to this aspect, it is possible to enable the information recording apparatus described later, to perform various judgment processes, more quickly and accurately.

In another aspect of the information recording medium of the present invention, the predetermined data is recorded in advance in at least one of the first recording layer and the second recording layer.

According to this aspect, by recording the predetermined data in advance by using laser light at the time of manufacturing the optical disc or the like, for example, it is possible to reduce a load on the recording operation of recording the predetermined data, performed by the information recording apparatus.

In another aspect of the information recording medium of the present invention, the predetermined data can be recorded into one portion or all of the data area, in at least one of the first recording layer and the second recording layer.

According to this aspect, it is possible to enable the information recording apparatus described later, to more accurately and quickly perform the recording operation which satisfies the above-mentioned recording order, on the one portion or all of the data area in which the predetermined data is recorded, while preventing a high load on the recording control process.

In another aspect of the information recording medium of the present invention, the predetermined data can be recorded in the first recording layer.

According to this aspect, it is possible to enable the information recording apparatus described later, to more accurately and quickly perform the recording operation including the random write, for example, which satisfies the above-mentioned recording order, on the first recording layer in which the predetermined data is recorded, while preventing a high load on the recording control process.

In another aspect of the information recording medium of the present invention, the predetermined data can be recorded in the second recording layer.

According to this aspect, with respect to the second recording layer in which the predetermined data is recorded by the information recording apparatus described later, a time length for the finalize process performed on the information recording medium is substantially the same as a recording time length of recording the effective record information, such as content information, for example. Thus, it is possible to realize great reduction and more efficient reduction in the time length for the finalize process.

In another aspect of the information recording medium of the present invention, recording management information (RMD) including the management information can be recorded into the management area.

According to this aspect, it is possible to enable the information recording apparatus described later to perform the recording operation which satisfies the above-mentioned recording order, more accurately and quickly, while preventing a high load on the recording control process, on the basis of the recording management information (RMD: Recording Management Data) including the management information.

(Information Recording Apparatus)

Hereinafter, the information recording apparatus of the present invention will be explained.

The above object of the present invention can be also achieved by an information recording apparatus for recording record information onto an information recording medium, provided at least with: a first recording layer (L0 layer) in which one portion of the record information including predetermined data can be recorded, the predetermined data being (i) capable of setting a recording layer close to a physically or optically recorded state, and (ii) capable of setting the recording layer close to a buffer state (in which data is embedded or buried) for finalizing; and a second recording layer (L1 layer) in which another portion of the record information can be recorded by laser light transmitted through the first recording layer, at least one of the first recording layer and the second recording layer provided with a management area (RMA) in which management information (Dummy Recording information) can be recorded, the management information including at least one of (iii) identification information indicating whether or not there is a predetermined data recording area (dummy data area) in which the predetermined data can be recorded, (iv) position information as for a position of the predetermined data recording area, and (v) attribute information as for an attribute of the predetermined data recording area, the information recording apparatus provided with: an obtaining device for obtaining the management information; a recording device for recording the record information; and a controlling device for controlling the recording device to record the record information on the basis of the obtained management information (holding Recording Order, efficient finalizing).

According to the information recording apparatus of the present invention, firstly, by the obtaining device, such as an optical pickup, for example, the management information (DR information) is obtained. Then, under the control of the controlling device, such as a CPU (Central Processing Unit) of a drive or a host computer, for example, the record information is recorded by the recording device, such as an optical pickup, on the basis of the obtained management information.

As a result, it is possible to perform the recording operation including the random write, for example, which satisfies the above-mentioned recording order, more accurately and quickly, on the information recording medium provided with the predetermined data recording area, while preventing a high load on the recording control process. In addition, with respect to the information recording medium provided with the predetermined data recording area, a time length for the finalize process performed on the information recording medium is substantially the same as a recording time length of recording the effective record information, such as content information, for example. Thus, it is possible to realize great reduction and more efficient reduction in the time length for the finalize process.

Incidentally, in response to the various aspects owned by the above-mentioned information recording medium of the present invention, the information recording apparatus of the present invention can adopt various aspects.

In one aspect of the information recording apparatus of the present invention, it is further provided with an updating device for updating the management information on the basis of (i) rewriting in the predetermined data recording area with the record information, or (ii) additional recording of the predetermined data.

According to this aspect, it is possible to perform the recording operation which satisfies the above-mentioned recording operation, more accurately and quickly, on the information recording medium provided with the predetermined data recording area, on the basis of the management information updated by the updating device. In addition, it is possible to realize great reduction and more efficient reduction in the time length for the finalize process, with respect to the information recording medium provided with the predetermined data recording area.

In another aspect of the information recording apparatus of the present invention, the controlling device controls the recording device to record the predetermined data into the first recording layer or the second recording layer, (i) in response to an instruction from a user, or (ii) simultaneously with the recording of the record information.

According to this aspect, the predetermined data for finalizing can be recorded onto the information recording medium, simultaneously with the recording of the record information, so that it is possible to realize great reduction and more efficient reduction in the time length for the finalize process, with respect to the information recording medium.

In another aspect of the information recording apparatus of the present invention, the controlling device controls the recording device to record the record information, on the basis of an incremental recording method.

According to this aspect, it is possible to receive the above-mentioned various benefits, with respect to the recording operation under the incremental recording method.

In another aspect of the information recording apparatus of the present invention, the controlling device controls the recording device to record the record information, on the basis of a layer jump recording method.

According to this aspect, it is possible to receive the above-mentioned various benefits, with respect to the recording operation under the layer jump recording method.

(Information Reproducing Apparatus)

Hereinafter, the information reproducing apparatus of the present invention will be explained.

The above object of the present invention can be also achieved by an information reproducing apparatus for reproducing record information from an information recording medium, provided at least with: a first recording layer (L0 layer) in which one portion of the record information including predetermined data can be recorded, the predetermined data being (i) capable of setting a recording layer close to a physically or optically recorded state, and (ii) capable of setting the recording layer close to a buffer state for finalizing (in which data is embedded or buried); and a second recording layer (L1 layer) in which another portion of the record information can be recorded by laser light transmitted through the first recording layer, at least one of the first recording layer and the second recording layer provided with a management area (RMA) in which management information (Dummy Recording information) can be recorded, the management information including at least one of (iii) identification information indicating whether or not there is a predetermined data recording area (dummy data area) in which the predetermined data can be recorded, (iv) position information as for a position of the predetermined data recording area, and (v) attribute information as for an attribute of the predetermined data recording area, the information reproducing apparatus provided with: an obtaining device for obtaining the management information; a reproducing device for reproducing the record information; and a controlling device for controlling the reproducing device to reproduce the record information on the basis of the obtained management information.

According to the information reproducing apparatus of the present invention, firstly, by the obtaining device, such as an optical pickup, for example, the management information (DR information) is obtained. Then, under the control of the controlling device, such as a CPU (Central Processing Unit) of a drive or a host computer, for example, the record information is reproduced by the reproducing device, such as an optical pickup, on the basis of the obtained management information.

As a result, it is possible to realize more highly accurate reproduction based on the management information, with respect to the information recording medium provided with the predetermined data recording area.

Incidentally, in response to the various aspects owned by the above-mentioned information recording medium of the present invention, the information reproducing apparatus of the present invention can adopt various aspects.

(Information Recording Method)

Hereinafter, the information recording method of the present invention will be explained.

The above object of the present invention can be also achieved by an information recording method in an information recording apparatus provided with a recording device for recording record information onto an information recording medium, provided at least with: a first recording layer L0 layer) in which one portion of the record information including predetermined data can be recorded, the predetermined data being (i) capable of setting a recording layer close to a physically or optically recorded state, and (ii) capable of setting the recording layer close to a buffer state for finalizing (in which data is embedded or buried); and a second recording layer (L1 layer) in which another portion of the record information can be recorded by laser light transmitted through the first recording layer, at least one of the first recording layer and the second recording layer provided with a management area (RMA) in which management information (Dummy Recording information) can be recorded, the management information including at least one of (iii) identification information indicating whether or not there is a predetermined data recording area (dummy recording area) in which the predetermined data can be recorded, (iv) position information as for a position of the predetermined data recording area, and (v) attribute information as for an attribute of the predetermined data recording area, the information recording method provided with: an obtaining process of obtaining the management information; a recording process of recording the record information; and a controlling process of controlling the recording device to record the record information on the basis of the obtained management information (holding Recording Order, efficient finalizing).

According to the information recording method of the present invention, it is possible to receive the various benefits owned by the above-mentioned information recording apparatus of the present invention.

Incidentally, in response to the various aspects owned by the above-mentioned information recording apparatus of the present invention, the information recording method of the present invention can adopt various aspects.

(Information Reproducing Method)

Hereinafter, the information reproducing method of the present invention will be explained.

The above object of the present invention can be also achieved by an information reproducing method in an information reproducing apparatus provided with a reproducing device for reproducing record information from an information recording medium, provided at least with: a first recording layer (L0 layer) in which one portion of the record information including predetermined data can be recorded, the predetermined data being (i) capable of setting a recording layer close to a physically or optically recorded state, and (ii) capable of setting the recording layer close to a buffer state for finalizing (in which data is embedded or buried); and a second recording layer (L1 layer) in which another portion of the record information can be recorded by laser light transmitted through the first recording layer, at least one of the first recording layer and the second recording layer provided with a management area (RMA) in which management information (Dummy Recording information) can be recorded, the management information including at least one of (iii) identification information indicating whether or not there is a predetermined data recording area (dummy recording area) in which the predetermined data can be recorded, (iv) position information as for a position of the predetermined data recording area, and (v) attribute information as for an attribute of the predetermined data recording area, the information reproducing method provided with: an obtaining process of obtaining the management information; a reproducing process of reproducing the record information; and a controlling process of controlling the reproducing device to reproduce the record information on the basis of the obtained management information.

According to the information reproducing method of the present invention, it is possible to receive the various benefits owned by the above-mentioned information reproducing apparatus of the present invention.

Incidentally, in response to the various aspects owned by the above-mentioned information reproducing apparatus of the present invention, the information reproducing method of the present invention can adopt various aspects.

(Computer Program)

Hereinafter, the computer-readable medium of the present invention will be explained.

The above object of the present invention can be also achieved by a computer program for record control to control a computer provided for the above-mentioned information recording apparatus of the present invention (including its various aspects), the computer program making the computer function as at least one portion of the obtaining device, the recording device, and the controlling device.

The above object of the present invention can be also achieved by a computer program for reproduction control to control a computer provided for the above-mentioned information reproducing apparatus of the present invention (including its various aspects), the computer program making the computer function as at least one portion of the obtaining device, the reproducing device, and the controlling device.

According to each of the computer programs of the present invention, the above-mentioned information recording apparatus or information reproducing apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects owned by the above-mentioned information recording apparatus or information reproducing apparatus of the present invention, the computer program of the present invention can adopt various aspects.

The above object of the present invention can be also achieved by a first computer program product in a computer-readable medium for tangibly embodying a program of instructions executable by a computer provided in the aforementioned information recording apparatus of the present invention (including its various aspects), to make the computer function as at least one portion of the obtaining device, the recording device, and the controlling device.

The above object of the present invention can be also achieved by a second computer program product in a computer-readable medium for tangibly embodying a program of instructions executable by a computer provided in the aforementioned information reproducing apparatus of the present invention (including its various aspects), to make the computer function as at least one portion of the obtaining device, the reproducing device, and the controlling device.

According to the first or second computer program product of the present invention, the aforementioned information recording apparatus or information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus or information reproducing apparatus of the present invention.

These effects and other advantages of the present invention will become more apparent from the embodiments explained below.

As explained above, according to the information recording medium of the present invention, it is provided with: the first recording layer; the second recording layer; and the management area (RMA) in which the management information can be recorded, the management information including at least one of the position information about the position of the predetermined data recording area, and the attribute information about the attribute of the predetermined data recording area. As a result, it is possible to enable the information recording apparatus described later, to perform the recording operation including the random write, for example, which satisfies the above-mentioned recording operation, more accurately and quickly, while preventing a high load on the recording control process. In addition, a time length for the finalize process performed on the information recording medium is substantially the same as a recording time length of recording the effective record information, such as content information, for example. Thus, it is possible to realize great reduction and more efficient reduction in the time length for the finalize process, which enables the user to feel greater comfort in the finalize process.

Moreover, according to the information recording apparatus of the present invention, it is provided with: the obtaining device; the recording device; and the controlling device, and according to the information recording method of the present invention, it is provided with: the obtaining process; the recording process; and the controlling process. As a result, it is possible to perform the recording operation including the random write, for example, which satisfies the above-mentioned recording operation, on the information recording medium provided with the predetermined data recording area, more accurately and quickly, while preventing a high load on the recording control process. In addition, with respect to the information recording medium provided with the predetermined data recording area, a time length for the finalize process performed on the information recording medium is substantially the same as a recording time length of recording the effective record information, such as content information, for example. Thus, it is possible to realize great reduction and more efficient reduction in the time length for the finalize process.

Moreover, according to the information reproducing apparatus of the present invention, it is provided with: the obtaining device; the reproducing device; and the controlling device, and according to the information reproducing method of the present invention, it is provided with: the obtaining process; the reproducing process; and the controlling process. As a result, it is possible to realize more highly accurate reproduction based on the management information, with respect to the information recording medium provided with the predetermined data recording area.

Furthermore, according to the computer program of the present invention, it makes a computer function as the above-mentioned information recording apparatus or the information reproducing apparatus. Thus, it is possible to perform the recording operation including the random write, for example, which satisfies the above-mentioned recording operation, on the above-mentioned information recording medium, more accurately and quickly, while preventing a high load on the recording control process. In addition, with respect to the above-mentioned information recording medium, a time length for the finalize process performed on the information recording medium is substantially the same as a recording time length of recording the effective record information, such as content information, for example. Thus, it is possible to realize great reduction and more efficient reduction in the time length for the finalize process.

BRIEF DESCRIPTION OF DRAWINGS

FIG. 4 are a table showing one specific example of management information of the present invention (FIG. 4(a)) and a table showing one specific example of the data structure of DR information associated with the management information of the present invention (FIG. 4(b)).

FIG. 5 is a table showing one specific example of attribute information of the present invention.

FIG. 7 is a table showing one specific example of the data structure of the DR information associated with the management information of the present invention, in association with a step 1 in FIG. 6.

FIG. 8 is a table showing one specific example of the data structure of the DR information associated with the management information of the present invention, in association with a step 2 in FIG. 6.

FIG. 16 are a table showing another specific example of the management information (FIG. 16($a$)), a table showing another specific example of the DR information associated with the management information of the present invention (FIG. 16($b$)), and a table showing another specific example of identification information of the present invention (FIG. 16($c$)).

FIG. 17 is a data structure diagram showing another specific example of transition in the recording areas of the optical disc in the embodiment of the information recording medium of the present invention.

FIG. 18 is a data structure diagram showing another specific example of transition in the recording areas of the optical disc in the embodiment of the information recording medium of the present invention.

FIG. 21 is a data structure diagram showing another specific example of transition in the recording areas of the optical disc in the embodiment of the information recording medium of the present invention.

FIG. 22 are a schematic diagram conceptually showing the recording order of the present invention (FIG. 22($a$)) and a graph showing it numerically (FIG. 22($b$)).

DESCRIPTION OF REFERENCE CODES

1 . . . center hole, 10 . . . track, 11 . . . ECC block, 50 . . . management information, 50$a$ . . . DR information, 100 . . . optical disc, 101 . . . lead-in area, 102 . . . data area, 103 . . . lead-out area, 104 . . . middle area, 104$s$ . . . shifted middle area, 300 . . . information recording/reproducing apparatus, 301 . . . optical pickup, 302 . . . signal recording/reproducing device, 303 . . . address detector, 305 . . . CPU (drive control device), 306 . . . spindle motor, 307 (402) . . . memory, 308 (406) . . . data input/output control device, 309 (407) . . . bus, 400 . . . host computer, 401 . . . CPU (for host), 403 . . . operation control device, 404 . . . operation button, 405 . . . display panel, CDZ . . . control data zone, RMA . . . recording management area, ROA . . . read only area, RWROA . . . write protected area, LB . . . laser light

BEST MODE FOR CARRYING OUT THE INVENTION

Hereinafter, the best mode for carrying out the present invention will be discussed in order for each embodiment, with reference to the drawings.

(1) Embodiment of Information Recording Medium

Next, with reference to FIG. 1 to FIG. 8, an embodiment of the information recording medium of the present invention will be discussed in detail.

(1-1) Basic Structure

Figure 1:
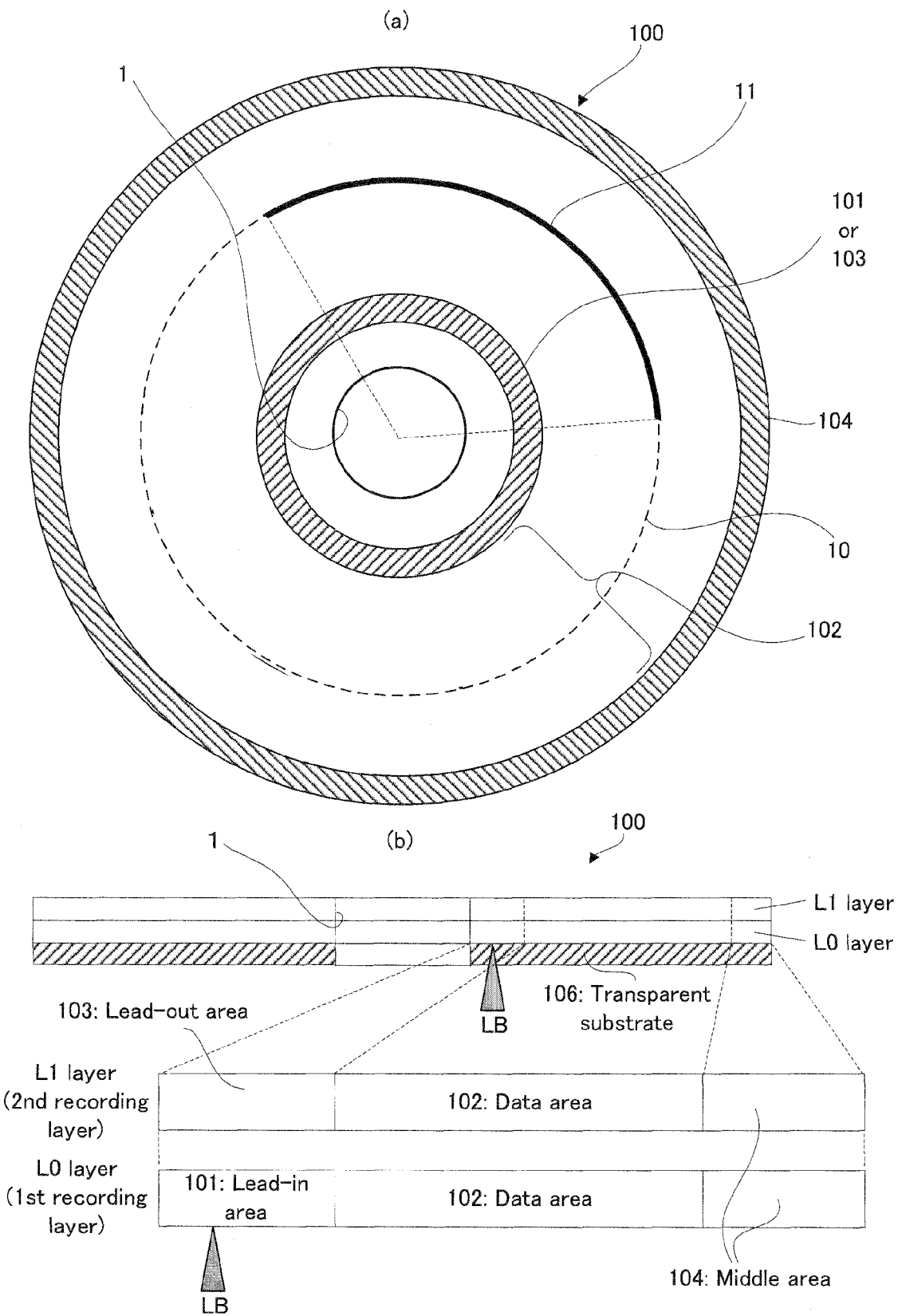
FIG. 1 are a substantial plan view showing the basic structure of an optical disc having a plurality of recording areas in an embodiment of the information recording medium of the present invention (FIG. 1(a)), and a conceptual view showing a recording area structure in the radial direction and associated with the substantial plan view of the optical disc.

Firstly, with reference to FIG. 1, the basic structure of an optical disc in an embodiment of the information recording medium of the present invention will be explained. FIG. 1 are a substantial plan view showing the basic structure of the optical disc having a plurality of recording areas in the embodiment of the information recording medium of the present invention (FIG. 1($a$)), and a conceptual view showing a recording area structure in the radial direction and associated with the substantial plan view of the optical disc. Incidentally, in the optical disc in the embodiment, the opposite method is applied, as one specific example of a recording method, in which the track path of an L0 layer and the track path of an L1 layer have opposite recording directions.

As shown in FIG. 1($a$) and FIG. 1($b$), an optical disc 100 has a recording surface on a disc main body with a diameter of about 12 cm, as is a DVD. On the recording surface, the optical disc 100 is provided with: a center hole 1 as the center; a lead-in area 101 or a lead-out area 103; a data area 102; and a middle area 104, which are associated with the embodiment. Then, for example, on a transparent substrate 106 of the optical disc 100, there are laminated recording layers, such as the L0 layer and the L1 layer. In each recording area of the recording layers, a track or tracks 10, such as groove tracks and land tracks, are alternately placed, spirally or concentrically, centered on the center hole 1. On the track 10, data is divided and recorded by a unit of ECC block 11. The ECC block 11 is a data management unit by which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(*b*), has such a structure that the L0 layer and the L1 layer, which constitute one example of the "first and second record layers" of the present invention descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower side to the upper side in FIG. 1(*b*). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers. Incidentally, a recording/reproducing procedure in the opposite method on the two-layer type optical disc and the data structure of each layer will be discussed later.

(1-2) Detailed Structure

Figure 2:
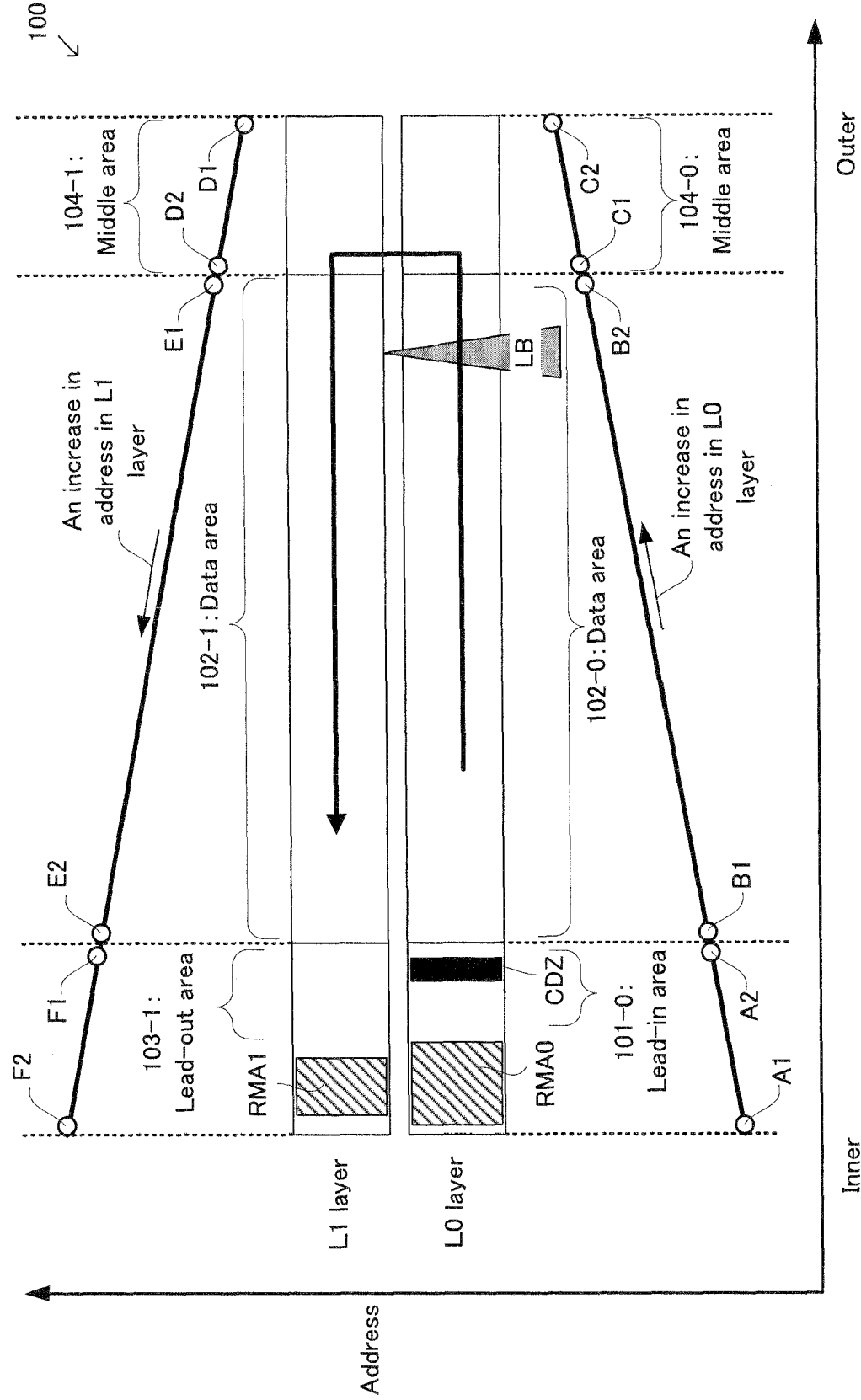
FIG. 2 is one conceptual graph showing the data structure of a two-layer type optical disc in the embodiment of the information recording medium of the present invention, an address, such as a physical sector number of a sector constituting an ECC block, in the recording areas of the optical disc, and a recording or reproduction method by an opposite method of the optical disc.
Figure 3:
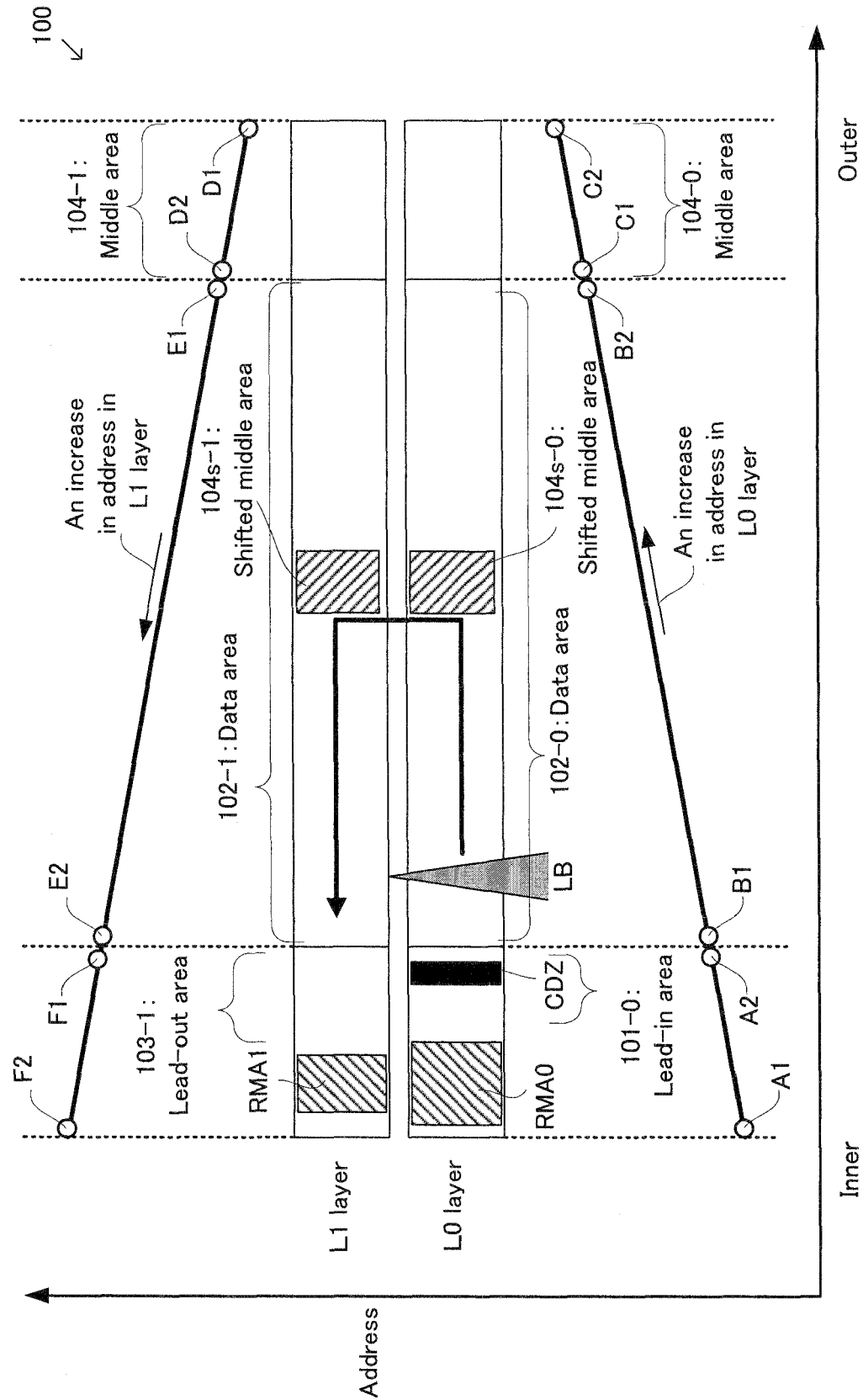
FIG. 3 is another conceptual graph showing the data structure of the two-layer type optical disc in the embodiment of the information recording medium of the present invention, the address, such as a physical sector number of a sector constituting an ECC block, in the recording areas of the optical disc, and the recording or reproduction method by the opposite method of the optical disc.

Next, with reference to FIG. 2 to FIG. 5, the detailed structure of the two-layer type optical disc in the embodiment of the information recording medium of the present invention will be explained. More specifically, with reference to FIG. 2 to FIG. 5, an explanation will be given for the data structure of the two-layer type optical disc, an address, such as a physical sector number of a sector constituting an ECC block, in the recording areas of the optical disc, and the recording or reproduction procedure by the opposite method of the optical disc. FIG. 2 is one conceptual graph showing the data structure of the two-layer type optical disc in the embodiment of the information recording medium of the present invention, the address, such as a physical sector number of a sector constituting an ECC block, in the recording areas of the optical disc, and the recording or reproduction method by an opposite method of the optical disc. FIG. 3 is another conceptual graph showing the data structure of the two-layer type optical disc in the embodiment of the information recording medium of the present invention, the address, such as a physical sector number of a sector constituting an ECC block, in the recording areas of the optical disc, and the recording or reproduction method by the opposite method of the optical disc. Incidentally, the vertical axis in FIG. 2 and FIG. 3 indicates the address, such as the physical sector, expressed as hexadecimal numbers, for example, and the horizontal axis indicates a relative position in the radial direction of the optical disc.

As shown in FIG. 2, the two-layer type optical disc 100 in the embodiment of the information recording medium of the present invention is provided with two recording layers, i.e. the L0 layer and the L1 layer, laminated on a not-illustrated transparent substrate. Specifically, the L0 layer is provided with: a recording management area RMA0; a lead-in area 101-0; a data area 102-0; and a middle area 104-0, from the inner to the outer circumferential side.

In the RMA 0 (and a RMA 1 described later), RMD (Recording Management Data), which is one example of the "management information" of the present invention, can be recorded. Specifically, in the RMA 0 (RMA 1), the RMD can be written once or additionally recorded about 818 times. The RMA 0 (RMA 1) constitutes one example of the "management area" of the present invention.

The lead-in area 101-0 is provided with a control data zone CDZ. In the CDZ, various information, such as the number of recording layers and the direction and track pitch of the recording track, for example, is formed in advance with embossed pits, for example, or it is pre-recorded by laser light or the like. In the data area 102-0, record information can be recorded. The middle area 104-0 has a basic function of preventing a recording or reproduction position in the L0 layer and the L1 layer from being away to an unrecorded area or off the substrate; however, it also has a function, as a so-called "jump buffer area", of preventing the recording or reproduction position from being away to the unrecorded area or off the substrate in layer jump.

On the other hand, the L1 layer is provided with: a middle area 104-1; a data area 102-1; a lead-out area 103-1; and a RMA 1, from the outer to the inner circumferential side. More specifically, the RMA 0 (RMA 1) and a not-illustrated calibration area for power calibration of the laser light may be collectively referred to as a "R-Information Area". Moreover, the above-mentioned lead-in area 101-0 (101-1), data area 102-0 (102-1), and middle area 104-0 (104-1) may be collectively referred to as an "Information Area".

Particularly in the embodiment, the predetermined data of the present invention may be recorded by an information recording apparatus described later, into the above-mentioned data area 102-0 or the like, for example, in predetermined timing, such as at the time of manufacturing the optical disc and at the time of background format simultaneously with the recording operation.

Moreover, in the optical disc 100 in the embodiment, as shown in FIG. 3, in an incremental recording method, a layer jump recording method, or the like, if the data amount of the record information is relatively smaller than the entire recording capacity of the optical disc, the outer circumferential edge of the data area 102-0 (102-1) may be disposed on the inner circumferential side. In this case, the optical disc 100 may be provided with a shifted middle area 104*s*-0 (104*s*-1), in a predetermined position located on the inner circumferential side of the outer circumferential edge of the data area 102-0 (102-1).

The two-layer type optical disc 100 is constructed in the above manner, so that in the recording or reproduction of the optical disc 100, the laser light LB is irradiated by an optical pickup or the like of an information recording/reproducing apparatus, which is one specific example of the information recording apparatus of the present invention described later, from the not-illustrated substrate side, i.e., from the lower side to the upper side in FIG. 2 and FIG. 3, to thereby control the focal distance thereof or the like, and also the travel distance and direction in the radial direction of the optical disc 100. By this, the data is recorded into each recording layer, or the recorded data is reproduced.

As the recording or reproduction procedure for the two-layer type optical disc in the embodiment of the information recording medium of the present invention, the opposite method is adopted. The opposite method herein is, more specifically, such a method that, as the recording or reproduction procedure for the two-layer type optical disc, the optical pickup of the information recording/reproducing apparatus described later is displaced from the inner to the outer circumferential side, i.e. in a direction of a right-pointing arrow in FIG. 2 and FIG. 3, in the L0 layer, whereas the optical pickup is displaced from the outer to the inner circumferential side, i.e. in a direction of a left-pointing arrow in FIG. 2 and FIG. 3, in the L1 layer, to thereby perform the recording or reproduction on the two-layer type optical disc. In the opposite method, if the recording or reproduction is ended in the L0 layer, the optical pickup, located on the outermost circumference of the optical disc, does not have to be displaced again to the innermost circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is adopted for the recording of a large-volume of content information.

Specifically, as shown in a graph part of FIG. 2, firstly, in the L0 layer, as the optical pickup is displaced in the lead-in area 101-0, the data area 102-0, and the middle area 104-0, from the inner to the outer circumferential side, the address, such as the sector number, in the recording areas of the optical disc 100 increases. More specifically, the optical pickup sequentially accesses an inner circumferential edge "A1" point, an end position "A2" point of the lead-in area 101-0, a start position "B1" point of the data area 102-0, and an end position "B2" point of the data area 102-0, and the optical pickup is displaced to the middle area 104-0 which functions as the buffer (whose start position is a "C1" point and whose end position is a "C2" point). By this, the recording or reproduction is performed in the L0 layer. On the other hand, in the L1 layer, as the optical pickup is displaced in the middle area 104-1, the data area 102-1, and the lead-out area 103-1, from the outer to the inner circumferential side, the sector number in the recording areas of the optical disc 100 increases. More specifically, the optical pickup sequentially accesses the middle area 104-1 which functions as the buffer (whose start position is a "D1" point and whose end position is a "D2" point), a start position "E1" point of the data area 102-1, and an end position "E2" point of the data area 102-1, and the optical pickup is displaced to the lead-out area 103-1 (whose start position is a "F1" point and whose end position is a "F2" point). By this, the recording or reproduction is performed in the L1 layer.

All the addresses, such as the sector numbers, in the L0 layer and the L1 layer explained above may have a predetermined correlation, such as a 15's complement number relationship in the hexadecimal numbers. More specifically, a turn-around point in the L0 layer (e.g. a sector number of "1AFFFFh") and a turn-around point in the L1 layer (e.g. a sector number of "E50000h") may have the 15's complement number relationship. Incidentally, "h" at the tail of "30000h" or the like in the example indicates that it is expressed as hexadecimal numbers. As a formal matter, the complement number of the "1AFFFFh" is obtained by converting the sector number of "1AFFFFh" in the hexadecimal numbers to a binary number of "00011101011111111111111111", inverting the bits to "11100101000000000000000000", and reconverting it to the "E50000h" in the hexadecimal numeral.

With respect to the physical sector number explained above, a LBA (Logical Block Address) may be allocated in a one-to-one manner. More specifically, "000000" LBA may correspond to the sector number "030000h", and "17FFFF" LBA may correspond to the sector number "1AFFFFh". Moreover, "180000" LBA may correspond to the sector number "E50000h", and "2FFFEF" LBA may correspond to the sector number "FCFFEFh". Thus, a host computer can perform the recording operation and the reproduction operation, in accordance with the logical block address managed by a file system, for example, without regard to the physical sector number.

(1-3) Management Information

Next, with reference to FIG. 4 to FIG. 5, an explanation will be given for one specific example of management information of the present invention and DR (Dummy Recording) information associated with the management information. FIG. 4 are a table showing one specific example of the management information of the present invention (FIG. 4(a)) and a table showing one specific example of the data structure of the DR information associated with the management information of the present invention (FIG. 4(b)). FIG. 5 is a table showing one specific example of attribute information of the present invention.

As shown in FIG. 4(a), management information 50 of the present invention may include a plurality of (i) position information and (ii) attribute information, each of which corresponds to respective one of a plurality of dummy data areas, in order to specify and manage the position of each of the plurality of dummy data areas DDA 1 to DDA "n" (wherein n is a natural number). Namely, the management information 50 may include position information and the attribute information for specifying and managing the position of the dummy data area DDA 1 in the first place, position information and the attribute information for specifying and managing the position of the dummy data area DDA 2 in the second place, and so on, and position information and the attribute information for specifying and managing the position of the dummy data area DDA "n" in the n-th place. Incidentally, the management information 50 may be able to be recorded directly into a recording management area RMA (hereinafter referred to as a "RMA", as occasion demands), for example. Alternatively, the management information 50 may be included in recording management data RMD (hereinafter referred to as a "RMD", as occasion demands), and may be able to be recorded indirectly via the RMD. Moreover, alternatively, the CDZ and a RW-physical format information zone, for example, may be provided with one field to record therein the DR information, and for example, a disc maker may form or record therein information about the dummy data areas, with embossed pits. In this case, with respect to the optical disc in the initial state, an information recording/reproducing apparatus described later may firstly record the DR information recorded in one field of the CDZ, for example, into the RMA, and then update the DR information in the RMA if the dummy data area is updated or additionally recorded, to thereby use it as the newest information. In particular, the management information in the case where the disc maker records the dummy data may be referred to as initial DR information (Initial Dummy Recording Information).

In addition, the management information 50 of the present invention may be constructed to hold a field to record therein (i) identification number information, so-called drive ID information (drive IDentification information) about the information recording/reproducing apparatus which performs the recording operation on the optical disc 100, (ii) numerical information about the optimum recording power detected as a result of the calibration process by the information recording/reproducing apparatus designated by a drive ID, and (iii) disc status information indicating the unrecorded or recorded state, the recording method, such as the incremental recording method, and a state after a finalize process is performed in which additional (or postscript) writing is impossible, or the like.

Specifically, as shown in FIG. 4(b), DR information (Dummy Recording information) 50a or initial DR information, which is one specific example of the management information 50, may include (i) the attribute information about the dummy data area DDA 1 in a data position of 0, (ii) the start address of the dummy data area DDA 1 in the data positions of 1 to 4, and (iii) the end address of the dummy data area DDA 1 in data positions of 5 to 8, wherein the data positions can be designated with numbers of 0 to 2047 allocated by a byte unit, for example. Incidentally, the management information, such as the DR information 50*a*, may include the recording capacity of the dummy data, instead of the end address. More specifically, as shown in FIG. 5, attribute information 51 may be expressed in predetermined bit patterns which correspond to respective four types of attributes (i.e. a data area attribute, a lead-in area attribute, a lead-out area attribute, and a middle area attribute, etc.), for example. Specifically, if the attribute information 51 has the same attribute as the data area, for example, it may be expressed by "0001b (binary expression)" or "01h (hexadecimal expression)". In the same manner, if the attribute information 51 has the same attribute as the lead-in area, for example, it may be expressed by "0010b" or "02h". If the attribute information 51 has the same attribute as the lead-out area, for example, it may be expressed by "0100b" or "04h". If the attribute information 51 has the same attribute as the middle area, for example, it may be expressed by "1000b" or "08h".

Back to the explanation of FIG. 4 again, in the same manner, the DR information 50*a* may include the attribute information about the dummy data area DDA 2 in a data position of 9, the start address of the dummy data area DDA 2 in data positions of 10 to 13, and the end address of the dummy data area DDA 2 in data positions of 14 to 17, and so on. In the effective data position at the end, the DR information 50*a* may include the attribute information about the dummy data area DDA 128 in a data position of 1143, the start address of the dummy data area DDA 128 in data positions of 1144 to 1147, and the end address of the dummy data area DDA 128 in data positions of 1148 to 1151. Incidentally, data positions of 1152 to 2047 may be set as a spare field. Moreover, it is constructed such that each of the attribute information holds a data amount of 1 byte, and each of the information indicating the start address and the information indicating the end address has a data amount of 4 bytes, for example; however, it is obvious that another data amount will do. Moreover, it is constructed such that the data positions can be designated with the numbers allocated by the byte unit; however, the data positions may be designated on the basis of a unit of another information amount.

(1-4) One Specific Example of Transition of Dummy Data Area

Figure 6:
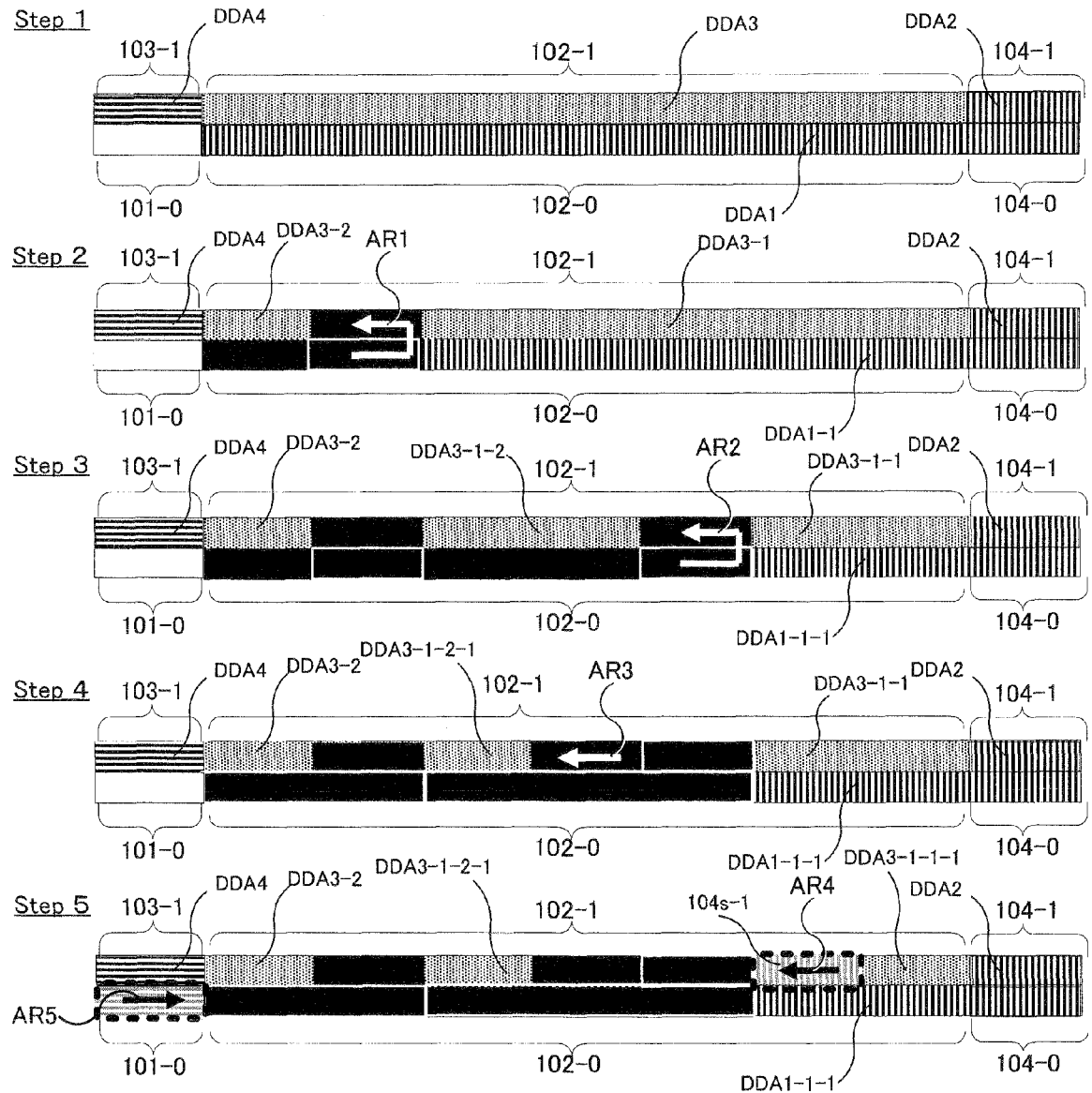
FIG. 6 is a data structure diagram showing one specific example of transition in the recording areas of the optical disc in the embodiment of the information recording medium of the present invention.

Next, with reference to FIG. 6 to FIG. 8, one specific example of the transition of the dummy data area will be explained. FIG. 6 is a data structure diagram showing one specific example of transition in the recording areas of the optical disc in the embodiment of the information recording medium of the present invention. FIG. 7 is a table showing one specific example of the data structure of the DR information associated with the management information of the present invention, in association with a step 1 in FIG. 6. FIG. 8 is a table showing one specific example of the data structure of the DR information associated with the management information of the present invention, in association with a step 2 in FIG. 6.

Firstly, as shown in a step 1 in FIG. 6, dummy data, which is one specific example of the predetermined data of the present invention, is recorded in predetermined timing, such as at the time of manufacturing the optical disc and at the time of background format simultaneously with the recording operation, for example. Specifically, in the dummy data area DDA 1 disposed in the data area 102-0 in the L0 layer and the middle area 104-0 in the L0 layer, the predetermined data with the middle area attribute (refer to a vertical-striped hatching) is recorded. Moreover, even in the dummy data area DDA 2 disposed in the middle area 104-1 in the L1 layer, the predetermined data with the middle area attribute is recorded. Moreover, in the dummy data area DDA 3 disposed in the data area 102-1 in the L1 layer, the predetermined data with the data area attribute (refer to a dotted hatching) is recorded. Moreover, in the dummy data area DDA 4 disposed in the lead-out area 103-1 in the L1 layer, the predetermined data with the lead-out area attribute (refer to a horizontal-striped hatching) is recorded.

Particularly in the embodiment, as shown in FIG. 7, the DR information 50*a*, which is one specific example of the management information of the present invention, includes (i) position information and (ii) attribute information, each of which corresponds to respective one of the dummy data areas DDA 1 to DDA 4, so that it is possible to specify and manage each of the four dummy data areas. Namely, on the basis of the DR information 50*a* shown in FIG. 7, the information recording/reproducing apparatus described later can judge or determine that the attribute of the dummy data area DDA 1 is "08h", which is the same as that of the middle area, the start address thereof is "0000 3000 h", and the end address thereof is "0002 3778 h". In the same manner, it can judge that the attribute of the dummy data area DDA 2 is "08h", which is the same as that of the middle area, the start address thereof is "00FD 0649 h", and the end address thereof is "00FD D109 h". Moreover, it can judge that the attribute of the dummy data area DDA 3 is "01h", which is the same as that of the data area, the start address thereof is "00FD D10A h", and the end address thereof is "00FF CC8F h". Moreover, it can judge that the attribute of the dummy data area DDA 4 is "04h", which is the same as that of the lead-out area, the start address thereof is "00FF CC90 h", and the end address thereof is "00FF D066 h".

Then, as shown in a step 2 in FIG. 6, for example, the record information is recorded on the basis of the layer jump recording method. Specifically, as shown in an arrow AR1 in a reversed C-shape, the record information (refer to a black hatching) is overwritten by a predetermined amount, from the inner to the outer circumferential side of the dummy data area DDA 1, and after layer jump to the L1 layer, the record information is overwritten by another predetermined amount toward the inner circumferential edge of the dummy data area DDA 3. Therefore, the dummy data area DDA 1 becomes a dummy data area DDA 1-1 which is a smaller recording area because of the overwriting of the record information on the inner circumferential side thereof. Moreover, the dummy data area DDA 3 is divided by the overwritten record information into two: a dummy data area DDA 3-1 and a dummy data area DDA 3-2.

Particularly in the embodiment, the information recording/reproducing apparatus described later can judge the transition of the above-mentioned dummy data area DDA 1 and the dummy data area DDA 3, from the DR information 50*a*, which is one specific example of the management information of the present invention shown in FIG. 8. Namely, the information recording/reproducing apparatus can judge that the start address of the dummy data area DDA 1-1 is transited from "0000 3000 h" to "0001 EF00 h". In the same manner, it can judge that the start address of the dummy data area DDA 3-1, which is one portion of the divided dummy data area DDA 3, is the above-mentioned "00FD D10A h", and the end address thereof is newly set to "00FE 10FF h". Moreover, it can judge that the start address of the dummy data area DDA 3-2, which is another portion of the divided dummy data area DDA 3, is newly set to "00FF 57E0 h", and the end address thereof is the above-mentioned "00FF CC8F h". Incidentally, it can also judge that there is no change in the other dummy data areas.

Then, as shown in a step 3 in FIG. 6, substantially in the same manner as the step 2, for example, the record information is overwritten by a predetermined amount, in accordance with the direction of an arrow AR2 in a reversed C-shape, from the inner to the outer circumferential side of the dummy data area DDA 1-1, and after layer jump to the L1 layer, the record information is overwritten by another predetermined amount toward the inner circumferential edge of the dummy data area DDA 3-1. Therefore, the dummy data area DDA 1-1 becomes a dummy data area DDA 1-1-1 which is a smaller recording area because of the overwriting of the record information on the inner circumferential side thereof. Moreover, the dummy data area DDA 3-1 is divided by the overwritten record information into two: a dummy data area DDA 3-1-1 and a dummy data area DDA 3-1-2. Incidentally, there is no change in the other dummy data areas.

Then, as shown in a step 4 in FIG. 6, in the L1 layer, for example, the record information is overwritten by a predetermined amount, in accordance with the direction of an arrow AR3, toward the inner circumferential edge of the dummy data area DDA 3-1-2. Therefore, the dummy data area DDA 3-1-2 becomes a dummy data area DDA 3-1-2-1 which is a smaller recording area because of the overwriting of the record information on the outer circumferential side thereof. Incidentally, there is no change in the other dummy data areas.

Lastly, as shown in a step 5 in FIG. 6, in the L1 layer, for example, buffer data for finalizing is recorded by a predetermined amount, in accordance with the direction of an arrow AR4, on the inner circumferential edge of the dummy data area DDA 3-1-1. Therefore, the dummy data area DDA 3-1-1 becomes a dummy data area DDA 3-1-1-1 which is a smaller recording area because of the recording of the buffer data on the inner circumferential side thereof. Then, in the L0 layer, for example, buffer data for finalizing is recorded into the lead-in area 101-0 by a predetermined amount, in accordance with the direction of an arrow AR5.

Consequently, it is possible to receive the following two effects.

As a first effect, a user can record arbitrary data into an arbitrary position in arbitrary timing in the L1 layer in addition to the L0 layer, i.e., it is possible to perform random write, by a simple recording process, such as a recording control process by a constant optimum recording power, under the layer jump recording method performed by the information recording/reproducing apparatus described later, while satisfying the above-mentioned recording order.

As a result, it is possible to enable the information recording apparatus described later, to perform the recording operation including the random write, for example, which satisfies the above-mentioned recording operation, more accurately and quickly, while preventing a high load on the recording control process.

Moreover, as a second effect, in the finalize process performed by the information recording/reproducing apparatus described later, in the recording area where the predetermined data with the middle area attribute is recorded (i.e. the dummy data area DDA 1-1-1, etc.), for example, it is hardly or not necessary at all to record the buffer data, such as padding data, which is mostly to set the area to the buffer state for the finalizing, for example. Therefore, in the finalize process performed on the information recording medium, it is possible to reduce the size of the recording area necessary to record therein the padding data, for example, or it is possible to almost or completely eliminate the recording area necessary to record therein the padding data.

As a result, a time length for the finalize process performed on the information recording medium is substantially the same as a recording time length of recording the effective record information, such as content information, for example. Thus, it is possible to realize great reduction and more efficient reduction in the time length for the finalize process, which enables the user to feel greater comfort in the finalize process.

(2) Embodiment of Information Recording Apparatus

Next, with reference to FIG. 9 to FIG. 14, the structure and the operation of an embodiment of the information recording apparatus of the present invention will be explained in detail. In particular, the embodiment is an example in which the information recording apparatus of the present invention is applied to an information recording/reproducing apparatus for an optical disc.

(2-1) Basic Structure

Figure 9:
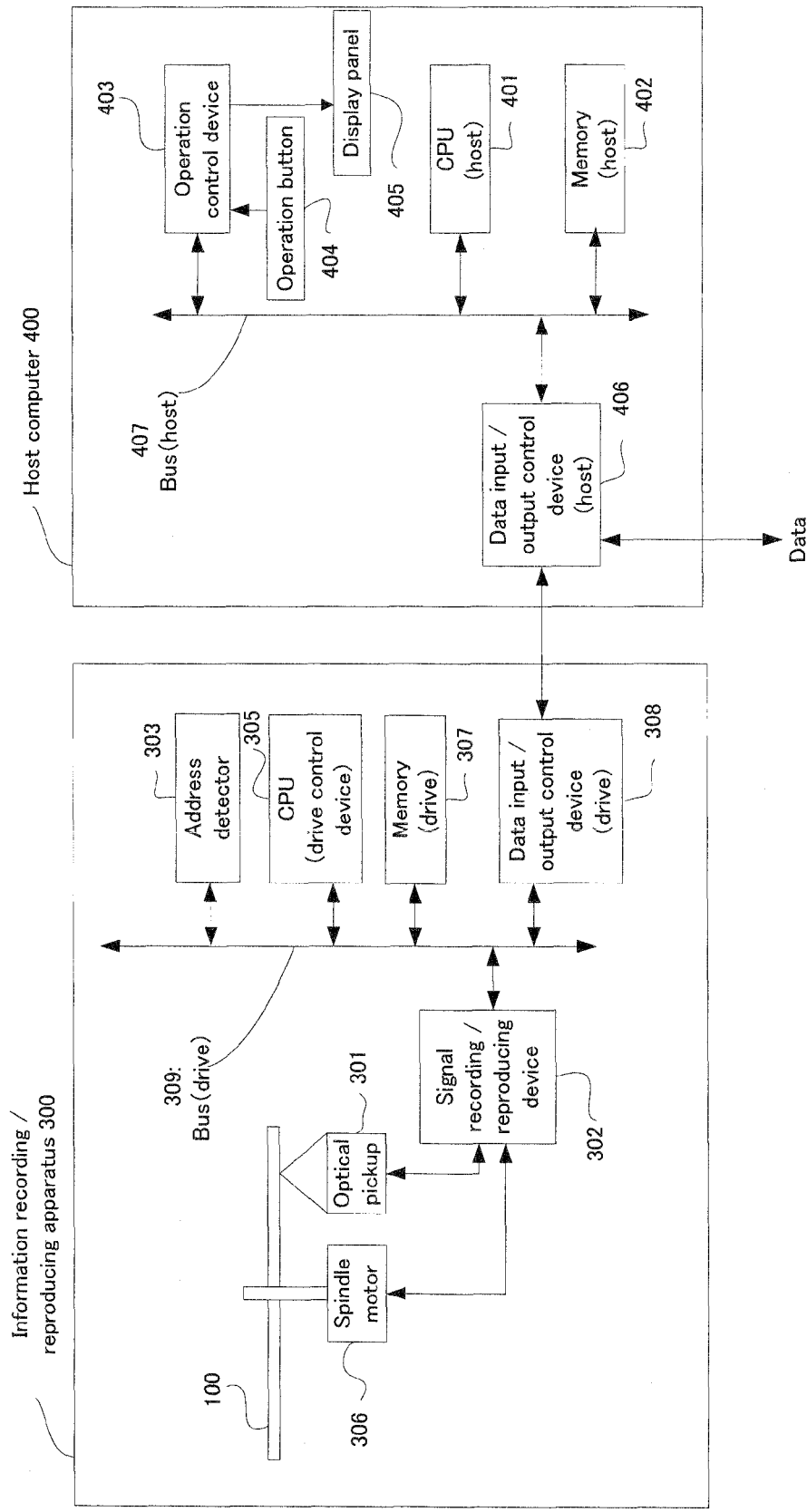
FIG. 9 is a block diagram showing the basic structures of an information recording apparatus in an embodiment of the information recording apparatus of the present invention and a host computer.

Firstly, with reference to FIG. 9, an explanation will be given for the basic structures of an information recording/reproducing apparatus 300 in the embodiment of the information recording apparatus of the present invention and a host computer 400. FIG. 9 is a block diagram showing the basic structures of the information recording/reproducing apparatus in the embodiment of the information recording apparatus of the present invention and the host computer. Incidentally, the information recording/reproducing apparatus 300 has a function of recording record data onto the optical disc 100 and a function of reproducing the record data recorded on the optical disc 100.

With reference to FIG. 9, the inner structure of the information recording/reproducing apparatus 300 will be explained. The information recording/reproducing apparatus 300 is an apparatus for recording information onto the optical disc 100 and reading the information recorded on the optical disc 100, under the control of a CPU (Central Processing Unit) 305 for drive.

The information recording/reproducing apparatus 300 is provided with: the optical disc 100; an optical pickup 301; a signal recording/reproducing device 302; an address detector 303; an address operator 304; the CPU (drive control device) 305; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to be capable of communicating with an external network, by housing the host computer 400 provided with a communication device, such as a modem, for example, in the same package. Alternatively, the information recording/reproducing apparatus 300 may be constructed to be capable of communicating with an external network, by that the CPU (host control device) 401 of the host computer 400 provided with a communication device, such as an i-link, directly controls the information recording/reproducing apparatus 300 via the data input/output control device 308 and the bus 309.

The optical pickup 301 performs the recording/reproduction with respect to the optical disc 100 and is provided with: a semiconductor laser apparatus; and a lens. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 performs the recording/reproduction with respect to the optical disc 100 by controlling the optical pickup 301 and the spindle motor 306. More specifically, the signal recording/reproducing device 302 is provided with a laser diode (LD) driver, a head amplifier, and the like. The LD driver drives the not-illustrated semiconductor laser built in the optical pickup 352. The head amplifier amplifies the output signal of the optical pickup 352, i.e., the reflected light of the light beam, and outputs the amplified signal. More specifically, the signal recording/reproducing device 302 drives the not-illustrated semiconductor laser built in the optical pickup 352 so as to determine an optimum laser power by a process of recording and reproducing an OPC pattern, together with a not-illustrated timing generator, under the control of the CPU 305, at the time of OPC (Optimum Power Control) process. In particular, the signal recording/reproducing device 302 constitutes one example of the "recording device" and the "reproducing device" of the present invention, with the optical pickup 301. Moreover, the signal recording/reproducing device 302 may be capable of obtaining the DR information 50a recorded in the control data zone CDZ or the recording management area RMA, for example. Thus, the signal recording/reproducing device 302 may constitute one example of the "obtaining device" of the present invention.

The address detector 303 detects the address (address information) on the optical disc 100, from a reproduction signal including a pre-format address signal or the like, outputted by the signal recording/reproducing device 302.

The CPU (drive control device) 305 controls the entire information recording/reproducing apparatus 300 by giving instructions to various control devices through the bus 309. Incidentally, software or firmware for operating the CPU 305 is stored in the memory 307. In particular, the CPU 305 is one example of the "controlling device" of the present invention.

The spindle motor 306 is intended to rotate and stop the optical disc 100, and operates in accessing the optical disc 100. More specifically, the spindle motor 306 is constructed to rotate and stop the optical disc 100 at a predetermined speed under spindle servo by a not-illustrated servo unit or the like.

The memory 307 is used in the general data processing and the OPC processing on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporarily storing the record/reproduction data; a Random Access Memory (RAM) area into which a parameter required for the operation of the firmware program or the like is stored; and the like.

The data input/output control device 308 controls the data input/output from the outside with respect to the information recording/reproducing apparatus 300, and performs storage and export with respect to the data buffer on the memory 307. A drive control command, which is issued from the external host computer 400 (hereinafter referred to as a "host", as occasion demands) connected to the disc drive 301 via an interface, such as a SCSI (Small Computer System Interface) and an ATAPI (AT Attachment Packet Interface), is transmitted to the CPU 305 through the data input/output control device 308. Moreover, the record/reproduction data is also exchanged with the host computer 400 through the data input/output control device 308 in the same manner.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of an operation instruction and display with respect to the host computer 400. The operation control device 403 sends an instruction of recording or reproduction by using the operation bottom 404, for example, to the CPU 401. The CPU 401 sends a control command to the information recording/reproducing apparatus 300 through the input/output control device 402, on the basis of the instruction information from the operation control device 403, to thereby control the entire information recording/reproducing apparatus 300. In the same manner, the CP.U 401 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 401 can output the operation condition of the information recording/reproducing apparatus 300, to the display panel 405, such as a fluorescent tube and a LCD, through the operation control device 403.

One specific example used by combining the information recording/reproducing apparatus 300 and the host computer 400, as explained above, is household equipment, such as recorder equipment for recording/reproducing video images. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the drive are connected to each other through the data input/output control device 308 (406), such as the SCSI and the ATAPI. An application, such as writing software, which is installed in the host computer, controls the disc drive.

(2-2) Operation Principle

Figure 10:
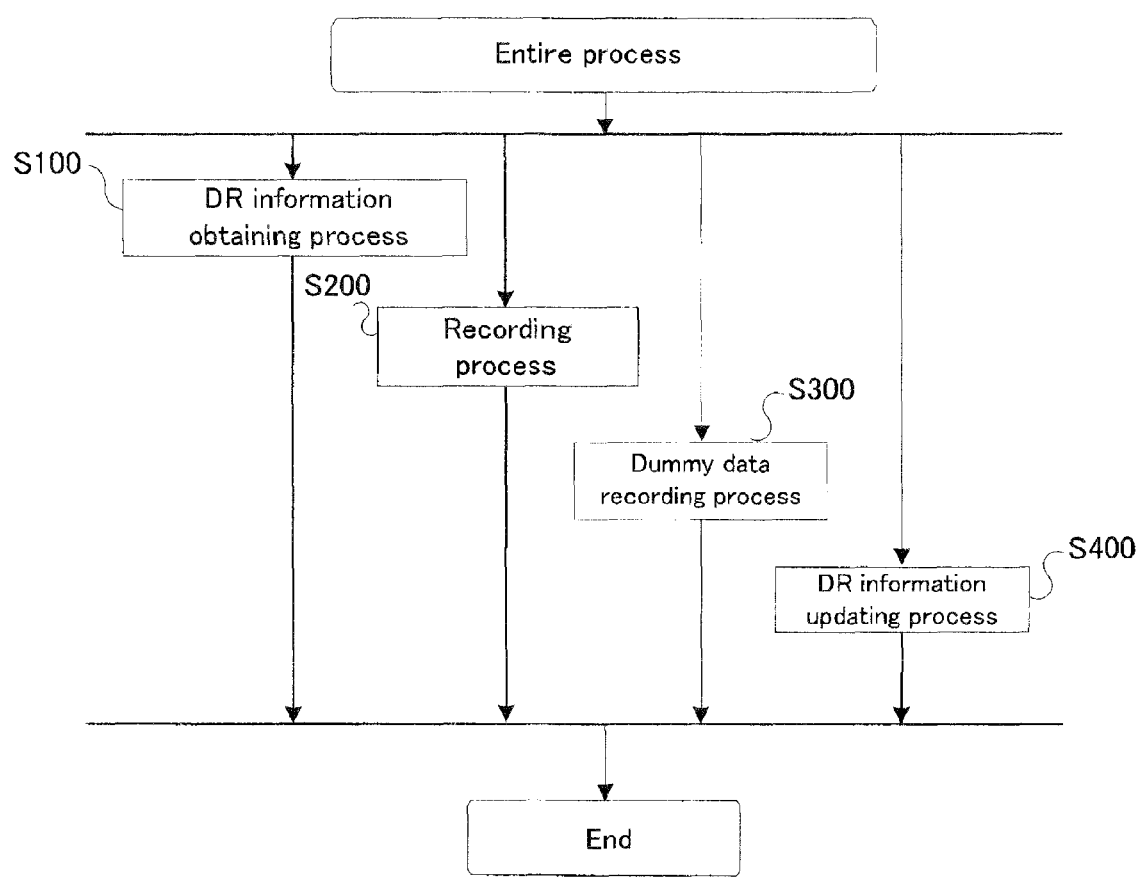
FIG. 10 is a flowchart showing an entire process including (i) an obtaining process of obtaining the DR (Dummy Recording) information, (ii) a recording process, (iii) a recording process of recording dummy data, and (iv) an updating process of updating the DR information, performed by the information recording/reproducing apparatus in the embodiment of the information recording apparatus of the present invention.
Figure 11:
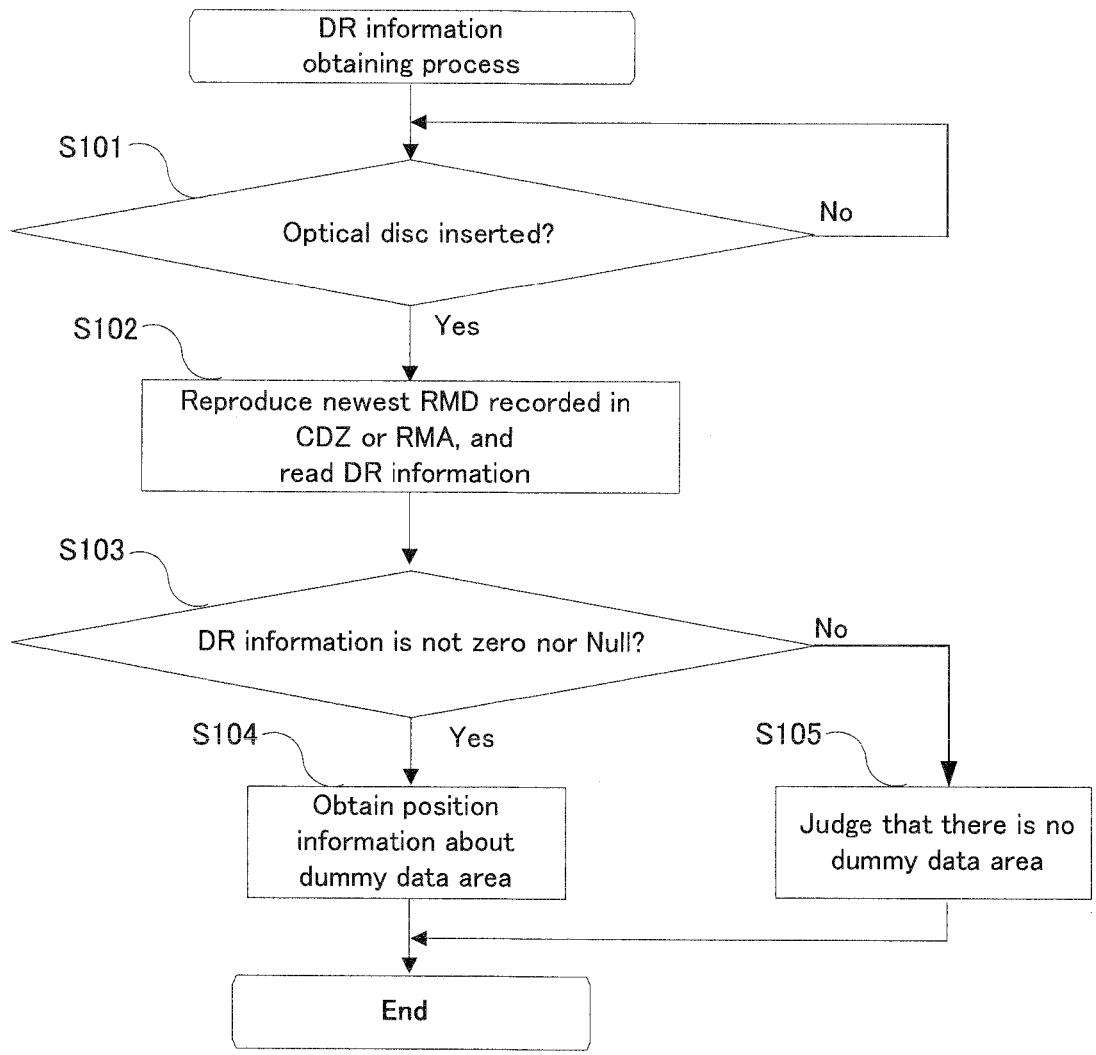
FIG. 11 is a flowchart showing (i) the obtaining process of obtaining the DR information performed by the information recording apparatus in the embodiment of the information recording apparatus of the present invention.
Figure 12:
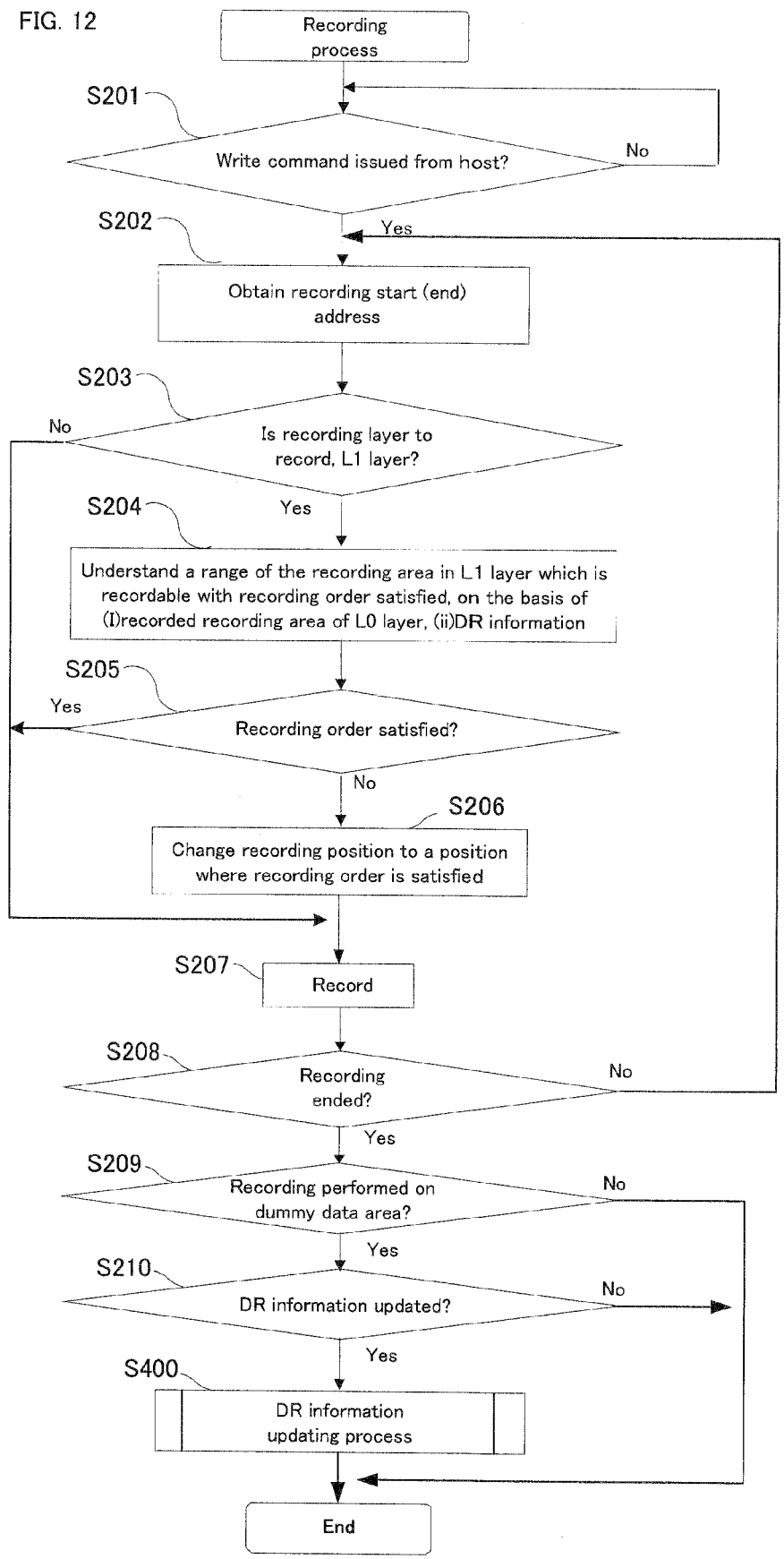
FIG. 12 is a flowchart showing (ii) the recording process performed by the information recording apparatus in the embodiment of the information recording apparatus of the present invention.

Next, with reference to FIG. 9 described above, as occasion demands, in addition to FIG. 10 to FIG. 13, an explanation will be given for the operation principle of the information recording/reproducing apparatus 300 in the embodiment of the information recording apparatus of the present invention. FIG. 10 is a flowchart showing an entire process including (i) an obtaining process of obtaining the DR (Dummy Recording) information, (ii) a recording process, (iii) a recording process of recording dummy data, and (iv) an updating process of updating the DR information, performed by the information recording/reproducing apparatus in the embodiment of the information recording apparatus of the present invention. FIG. 11 is a flowchart showing (i) the obtaining process of obtaining the DR information performed by the information recording apparatus in the embodiment of the information recording apparatus of the present invention. FIG. 12 is a flowchart showing (ii) the recording process performed by the information recording apparatus in the embodiment of the information recording apparatus of the present invention.

Figure 13:
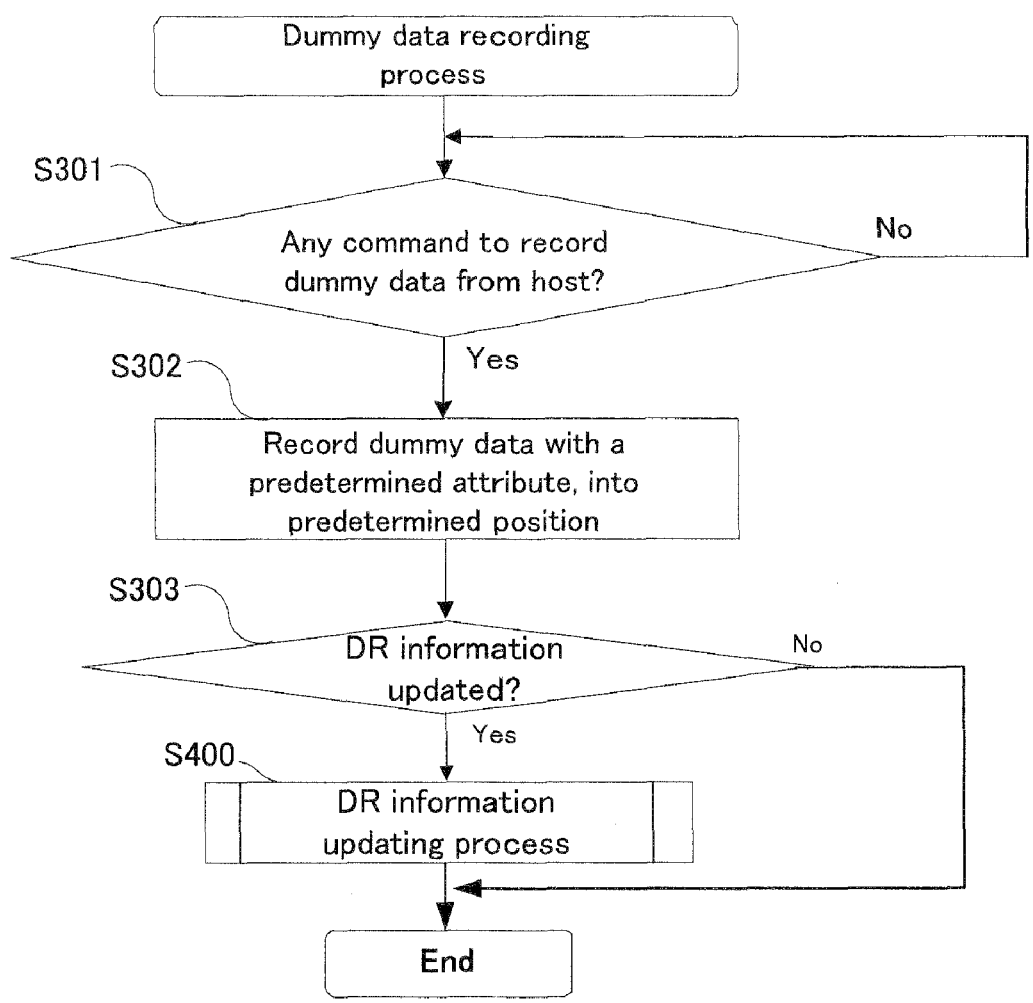
FIG. 13 is a flowchart showing (iii) the recording process of recording dummy data performed by the information recording apparatus in the embodiment of the information recording apparatus of the present invention.
Figure 14:
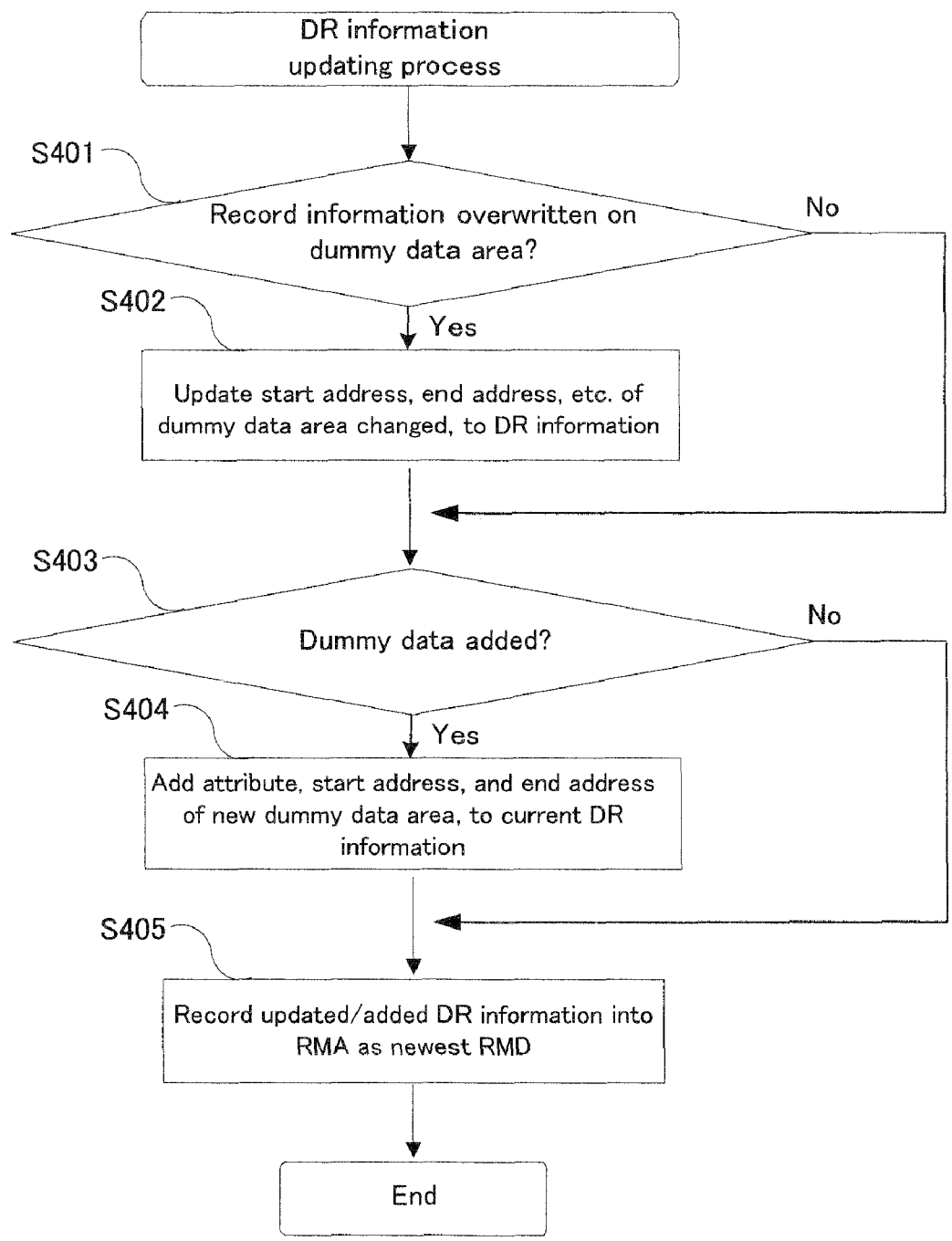
FIG. 14 is a flowchart showing (iv) the updating process of updating the DR information performed by the information recording apparatus in the embodiment of the information recording apparatus of the present invention.

FIG. 13 is a flowchart showing (iii) the recording process of recording dummy data performed by the information recording apparatus in the embodiment of the information recording apparatus of the present invention. FIG. 14 is a flowchart showing (iv) the updating process of updating the DR information performed by the information recording apparatus in the embodiment of the information recording apparatus of the present invention.

(2-2-1) Entire Process

As shown in FIG. 10, in the entire process of the information recording/reproducing apparatus, (i) the DR information obtaining process (step S100), (ii) the recording process (step S200), (iii) the dummy data recording process (step S300), and (iii) the DR information updating process (step S400) are performed, substantially at the same time, or in tandem.

(2-2-2) DR (Dummy Recording) Information Obtaining Process

As shown in FIG. 11, in the DR information obtaining process, firstly, under the control of the CPU (drive control device) 305, it is judged whether or not the optical disc is inserted (step S101). If the optical disc is inserted (the step S101 Yes), the newest RMD (Recording Management Data) recorded in the CDZ in the lead-in area or the RMA is reproduced, to thereby read the DR information, under the control of the CPU 305 (step S102).

Then, under the control of the CPU 305, it is judged whether or not (i) the read DR information is not zero or null, (ii) identification information (refer to a DR code or the like in FIG. 15 described later), such as a flag, indicating whether or not the dummy data is recorded, or (iii) the start address or the end address in the dummy data area is recorded therein (step S103). More specifically, in order to judge whether the recorded middle area or lead-out area is in a normal condition formed by the finalize process, or is the dummy data area in the embodiment, the judgment can be also performed on the basis of whether or not the lead-in area is in a complete condition complied with a predetermined standard in which the reading can be performed, instead of or in addition to the reading of the DR information. If the lead-in area is in an incomplete condition in which the reading cannot be performed and which is not complied with the predetermined standard, it may be judged that the finalizing is not performed, and the overwriting may be also performed in the middle area and the lead-out area which are already recorded.

In the above-mentioned step S103, if the read DR information is not zero or null, and the start address and the end address in the dummy data area is recorded therein (the step S103: Yes), the position information, such as the start address and the end address, indicating the position of the dummy data area is obtained from the DR information included in the CDZ or the newest RMD, under the control of the CPU 305 (step S104).

On the other hand, as a result of the judgment in the step S103, if the read DR information is zero or null, and the position information, such as the start address and the end address in the dummy data area, is not recorded therein (the step S103: No), it is judged that there is no dummy data area on the optical disc, under the control of the CPU 305 (step S105). Moreover, on the other hand, as a result of the judgment in the step S101, if the optical disc is not inserted (the step S101: No), it is judged again whether or not the optical disc is inserted (the step S101).

(2-2-3) Recording Process

As shown in FIG. 12, in the recording process, firstly, it is judged whether or not a write command, for example, to start the recording process is issued from the host computer, under the control of the CPU 305 (step S201). If the write command to start the recording process is issued (the step S201: Yes), an address at which the recording is started in the recording area (hereinafter a "recording start address") and/or an address at which the recording is ended in the recording area (hereinafter a "recording end address"), for example, are obtained, under the control of the CPU 305 (step S202). On the other hand, if the write command, for example, to start the recording process is not issued (the step S201: No), the issue is waited for again.

Then, under the control of the CPU 305, it is judged whether or not a position targeted for the recording (a target recording position) which is specified by the recording start address or the recording end address or the like, for example, exists in the L1 layer (step S203). If the target recording position exists in the L1 layer (the step S203: Yes), then, under the control of the CPU 305, a range of the recording areas in the L1 layer which is recordable with the recording order satisfied is understood, on the basis of (i) the position information about the recorded recording areas of the L0 layer obtained from a SBM (Space Bit Map), for example, and (ii) the obtained DR information (step S204).

Then, under the control of the CPU 305, it is judged whether or not the recording operation can be performed in the target recording position, with the recording order satisfied (step S205). If the recording operation cannot be performed in the target recording position, with the recording order satisfied (the step S205: No), the recording position is changed to a position where the recording order is satisfied, under the control of the CPU 305 (step S206). Incidentally, in order to satisfy the recording order, the dummy data may be recorded into the L0 layer, for example, so that the initially set recording position does not have to be changed.

Then, under the control of the CPU 305, the record information is recorded from the recording start address, for example (step S207).

Then, under the control of the CPU 305, it is judged whether or not the recording of the record information is ended (step S208). If the recording of the record information is ended (the step S208: Yes), it is judged whether or not a position where the record information is recorded is to be overwritten into or has been overwritten in the dummy data area, under the control of the CPU 305 (step S209). In particular, it may be judged whether or not a position where the record information is scheduled to be recorded is to be overwritten into the dummy data area, on the basis of the information amount of the record information scheduled to be recorded and the recording start address, under the control of the CPU 305, simultaneously or in tandem with the obtainment of the recording start address and/or the recording end address in the above-mentioned step S202, for example. If the position where the record information is recorded is to be overwritten into or has been overwritten in the dummy data area (the step S209: Yes), it is judged whether or not the DR information is updated, under the control of the CPU 305 (step S210). If the DR information is updated (the step S210: Yes), the DR information updating process described later is performed, under the control of the CPU 305 (the step S400).

On the other hand, if the position where the record information is recorded is not to be overwritten into the dummy data area as a result of the judgment in the above-mentioned step S209 (the step S209: No), or if the DR information is not updated as a result of the judgment in the above-mentioned step S210 (the step S210: No), a series of recording process is ended, under the control of the CPU 305.

On the other hand, if the target recording position does not exist in the L1 layer as a result of the judgment in the above-mentioned step S203 (the step S203: No), or if the recording operation can be performed in the target recording position, with the recording order satisfied (the step S205: Yes), as described above, under the control of the CPU 305, the record information is recorded from the recording start address, for example (the step S207).

On the other hand, as a result of the judgment in the step S208, if the recording of the record information is not ended (the step S208: No), as described above, the address at which the recording is started and/or the address at which the recording is ended in the recording area, for example, are obtained, under the control of the CPU 305 (the step S202).

(2-2-4) Dummy Data Recording Process

As shown in FIG. 13, in the dummy data recording process, firstly, it is judged whether or not a write command, for example, to start the dummy data recording process is issued from the host computer, under the control of the CPU 305 (step S301). If the write command to start the dummy data recording process is issued (the step S301: Yes), dummy data with a predetermined attribute is recorded into a predetermined position, under the control of the CPU 305 (step S302). On the other hand, if the write command, for example, to start the dummy data recording process is not issued (the step S201: No), the issue is waited for again.

Then, it is judged whether or not the DR information is updated, under the control of the CPU 305 (step S303). If the DR information is updated (the step S303: Yes), the DR information updating process described later is performed, under the control of the CPU 305 (the step S400).

On the other hand, as a result of the judgment in the step S303, if the DR information is not updated (the step S303: No), a series of recording process is ended.

(2-2-5) DR Information Updating Process

As shown in FIG. 14, in the DR information updating process, firstly, under the control of the CPU 305, it is judged whether or not the record information has been overwritten on or is to be overwritten onto the dummy data area (step S401). If the record information has been overwritten on or is to be overwritten onto the dummy data area (the step S401: Yes), the attribute, the start address, and the end address of the changed dummy data are reflected in the DR information, and the DR information is updated (step S402). On the other hand, if the record information is not to be overwritten onto the dummy data area (the step S401: No), the step S402 is omitted.

Then, under the control of the CPU 305, it is judged whether or not the dummy data has been additionally recorded or is to be recorded (step S403). If the dummy data has been additionally recorded or is to be recorded (the step S403: Yes), the attribute, the start address, and the end address of the newly recorded dummy data are added to the current DR information (step S404). On the other hand, if the dummy data is not to be recorded (the step S403: No), the step S404 is omitted.

Lastly, the updated or added DR information is recorded into the RMA, as the newest RMD (step S405). Specifically, for example, as shown in FIG. 7 and FIG. 8 described above, the attribute information and the position information for specifying the dummy data area DDA 3-1 and the dummy data area DDA 3-2 are added to the DR information, and the RMD including this DR information is recorded into the RMA, as the newest RMD.

Incidentally, the above-mentioned DR information updating process may be performed on a storage device, such as a memory, for example, of the information recording/reproducing apparatus, and may be recorded into the RMA when the optical disc is ejected, for example. Alternatively, the recording for updating the DR information may be performed directly on the RMA of the optical disc at each time of the updating.

(3) Another Specific Example of Management Information—Part 1—

Figure 15:
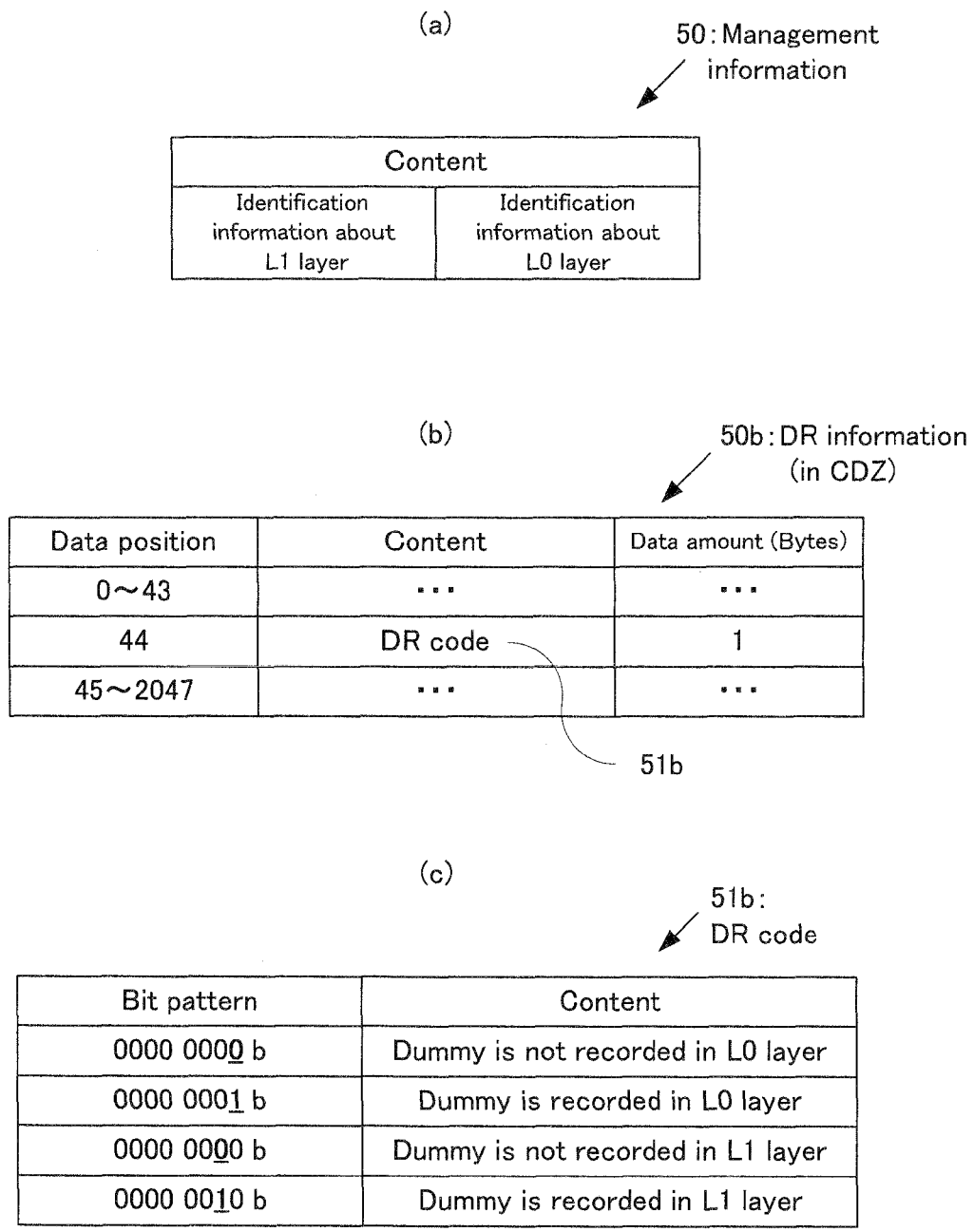
FIG. 15 are a table showing another specific example of the management information (FIG. 15($a$)), a table showing another specific example of the DR information associated with the management information of the present invention (FIG. 15($b$)), and a table showing another specific example of identification information of the present invention (FIG. 15($c$)).

Next, with reference to FIG. 15, an explanation will be given for another specific example of the management information of the present invention, and the DR (Dummy Recording) information associated with the management information. FIG. 15 are a table showing another specific example of the management information (FIG. 15(*a*)), a table showing another specific example of the DR information associated with the management information of the present invention (FIG. 15(*b*)), and a table showing another specific example of identification information of the present invention (FIG. 15(*c*)).

As shown in FIG. 15(*a*), management information 50 of the present invention may include (i) identification information about the L0 layer, i.e. identification information indicating whether or not the dummy data is recorded in the L0 layer, and (ii) identification information about the L1 layer, i.e. identification information indicating whether or not the dummy data is recorded in the L1 layer. Incidentally, with regard to the management information 50, the CDZ and the RW-physical format information zone, for example, may be provided with one field to record therein the DR information, and, for example, a disc maker may form or record therein information about the dummy data areas with embossed pits. In this case, with respect to the optical disc in the initial state, the information recording/reproducing apparatus may firstly record the DR information recorded in one field of the CDZ, for example, into the RMA, and then update the DR information in the RMA if the dummy data area is updated or additionally recorded, to thereby use it as the newest information. Alternatively, the management information 50 may be able to be recorded directly into the recording management area RMA, for example. Moreover, alternatively, the management information 50 may be included in the recording management data RMD, and may be able to be recorded indirectly via this RMD.

Specifically, as shown in FIG. 15(*b*), DR information 50*b*, which is another specific example of the management information 50, may include a DR (Dummy Recording) code 51*b*, which is one specific example of the identification information of the present invention, in a 44-th data position, for example, out of the data positions which can be designated with numbers of 0 to 2047 allocated by the byte unit, for example. More specifically, as shown in FIG. 15(*c*), the DR code 51*b* may be also expressed by combining (i) a predetermined bit pattern indicating whether or not the dummy data is recorded in the L0 layer, for example, and (ii) a predetermined bit pattern indicating whether or not the dummy data is recorded in the L1 layer, for example. Specifically, if the first bit from the right is "0" in the DR code 51*b*, it may mean that the dummy data is not recorded in the L0 layer. On the other hand, if the first bit from the right is "1" in the DR code 51*b*, it may mean that the dummy data is recorded in the L0 layer. Substantially in the same manner, if the second bit from the right is "0" in the DR code 51*b*, it may mean that the dummy data is not recorded in the L1 layer. On the other hand, if the second bit from the right is "1" in the DR code 51*b*, it may mean that the dummy data is recorded in the L1 layer. Incidentally, the third to 8th bits from the right may be also set as spare bits. Moreover, it is obvious that the identification information of the present invention can be realized by various bit patterns.

(4) Another Specific Example of Management Information—Part 2—

Next, with reference to FIG. 16, an explanation will be given for another specific example of the management information of the present invention, and the DR (Dummy Recording) information associated with the management information. Incidentally, substantially the same content as that of another specific example of the management information explained in FIG. 15 described above is omitted. FIG. 16 are a table showing another specific example of the management information (FIG. 16(a)), a table showing another specific example of the DR information associated with the management information of the present invention (FIG. 16(b)), and a table showing another specific example of identification information of the present invention (FIG. 16(c)).

As shown in FIG. 16(a), management information 50 of the present invention may include (i) identification information in which the L0 layer is described in detail, i.e. identification information indicating whether or not the dummy data with what attribute is recorded in the L0 layer, and (ii) identification information in which the L1 layer is described in detail, i.e. identification information indicating whether or not the dummy data with what attribute is recorded in the L1 layer. The other structure and the like are substantially the same as those of another specific example of the management information explained in FIG. 15 described above.

Specifically, as shown in FIG. 16(b), DR information 50c, which is another specific example of the management information 50, may include a DR (Dummy Recording) code 51c, which is one specific example of the identification information of the present invention, in a 44-th data position, for example, out of the data positions which can be designated with numbers of 0 to 2047 allocated by the byte unit, for example. More specifically, as shown in FIG. 16(c), the DR code 51c may be also expressed by combining (i) a predetermined bit pattern indicating whether or not the dummy data with what attribute is recorded in the L0 layer, for example, and (ii) a predetermined bit pattern indicating whether or not the dummy data with what attribute is recorded in the L1 layer, for example. Specifically, if the first and second bits from the right are "00" in the DR code 51c, it may mean that the dummy data is not recorded in the L0 layer. On the other hand, if the first and second bits from the right are "01" in the DR code 51c, it may mean that the dummy data with the data area attribute is recorded in the L0 layer. Moreover, on the other hand, if the first and second bits from the right are "10" in the DR code 51c, it may mean that the dummy data with the middle area attribute is recorded in the L0 layer. Moreover, on the other hand, if the first and second bits from the right are "11" in the DR code 51c, it may mean that the dummy data with the lead-out area attribute is recorded in the L0 layer.

Substantially in the same manner, if the third and fourth bits from the right are "00" in the DR code 51c, it may mean that the dummy data is not recorded in the L1 layer. On the other hand, if the third and fourth bits from the right are "01" in the DR code 51c, it may mean that the dummy data with the data area attribute is recorded in the L1 layer. Moreover, on the other hand, if the third and fourth bits from the right are "10" in the DR code 51c, it may mean that the dummy data with the middle area attribute is recorded in the L1 layer. Moreover, on the other hand, if the third and fourth bits from the right are "11" in the DR code 51c, it may mean that the dummy data with the lead-out area attribute is recorded in the L1 layer. Incidentally, the 5th to 8th bits from the right may be also set as spare bits. Moreover, it is obvious that the identification information of the present invention can be realized by various bit patterns.

(5) Other Specific Examples of Transition of Dummy Data Area

Next, with reference to FIG. 17 to FIG. 21, other specific examples of the transition of the dummy data area will be explained. FIG. 17 to FIG. 21 are schematic data structure diagram showing other specific examples of the transition in the recording areas of the optical disc in the embodiment of the information recording medium of the present invention. Incidentally, the data structure of the DR information for specifying the dummy data area is substantially the same as that of the DR information explained in FIG. 4, FIG. 5, FIG. 7, and FIG. 8 explained above. Moreover, the patterns of the hatching indicating the dummy data area in FIG. 17 to FIG. 21 are the same as those of the hatching in FIG. 6 described above.

(5-1) Specific Examples of Transition of Dummy Data Area—Part 1—

Firstly, as shown in a step 1 in FIG. 17, dummy data, which is one specific example of the predetermined data of the present invention, is recorded in predetermined timing, such as at the time of manufacturing the disc and at the time of background format simultaneously with the recording operation, for example. Specifically, in a dummy data area DDA 1 disposed in the data area 102-0 in the L0 layer and the middle area 104-0 in the L0 layer, the predetermined data with the middle area attribute (refer to a vertical-striped hatching) is recorded. Moreover, even in a dummy data area DDA 2 disposed in the middle area 104-1 in the L1 layer, the predetermined data with the middle area attribute is recorded. Moreover, in a dummy data area DDA 3 disposed in the data area 102-1 in the L1 layer, the predetermined data with the lead-out area attribute (refer to a horizontal-striped hatching) is recorded. Moreover, in a dummy data area DDA 4 disposed in the lead-out area 103-1 in the L1 layer, the predetermined data with the lead-out area attribute (refer to a horizontal-striped hatching) is recorded.

Then, as shown in a step 2 and a step 3 in FIG. 17, for example, the record information is recorded on the basis of the incremental recording method, for example. Specifically, as shown in an arrow AR1 and an arrow AR2, the record information (refer to a black hatching) is overwritten by a predetermined amount, from the inner to the outer circumferential side of the dummy data area DDA 1. Therefore, the dummy data area DDA 1 becomes a dummy data area DDA 1-1 and a dummy data area 1-1-1 which are smaller recording areas because of the overwriting of the record information on the inner circumferential side thereof.

Then, as shown in a step 4 in FIG. 17, for example, if the finalizing is performed, buffer data for the finalizing is recorded in the L1 layer by a predetermined amount, in accordance with the direction of an arrow AR3, in the recording area of the DDA 3 facing the dummy data area DDA 1-1-1. Therefore, the dummy data area DDA 3 is divided into two: a dummy data area DDA 3-1 and a dummy data area DDA 3-2, which are smaller recording areas because of the recording of the buffer data in one portion of the recording areas thereof. Then, in the L0 layer, for example, buffer data for the finalizing is recorded into the lead-in area 101-0 by a predetermined amount, in accordance with the direction of an arrow AR4.

Then, as shown in a step 5 and a step 6 in FIG. 17, for example, the record information is recorded on the basis of the incremental recording method, for example, following the step 3. Specifically, as shown in an arrow AR5 and an arrow AR6, the record information (refer to a black hatching) is overwritten by a predetermined amount, up to the outer circumferential edge of the data area 102-0 in the L0 layer, and from the outer to the inner circumferential side in the L1 layer. Therefore, the dummy data area DDA 3-2 becomes a dummy data area DDA 3-2-1 which is a smaller recording area because of the overwriting of the record information on the outer circumferential side thereof.

Lastly, as shown in a step 7 in FIG. 17, for example, if the finalizing is performed, in the L0 layer, the buffer data is recorded into the lead-in area 101-0 by a predetermined amount, in accordance with the direction of an arrow AR7.

As described above, in the finalize process performed by the information recording/reproducing apparatus, for example, in the recording area where the predetermined data with the middle area attribute is recorded (i.e. the dummy data area DDA 2, etc.), it is hardly or not necessary at all to record the buffer data, such as padding data, which is mostly to set the area to a buffer state for the finalizing, for example. Therefore, it is possible to realize the finalize process, more efficiently.

(5-2) Specific Examples of Transition of Dummy Data Area—Part 2—

Firstly, as shown in a step 1 in FIG. 18, dummy data, which is one specific example of the predetermined data of the present invention, is recorded in predetermined timing, such as at the time of manufacturing the disc and at the time of background format simultaneously with the recording operation, for example. Specifically, in a dummy data area DDA 1 disposed in the data area 102-0 in the L0 layer and the middle area 104-0 in the L0 layer, in a dummy data area DDA 2 disposed in the middle area 104-1 in the L1 layer, and in a dummy data area DDA 3 disposed in the data area 102-1 in the L1 layer, the predetermined data with the middle area attribute (refer to a vertical-striped hatching) is recorded. Moreover, in a dummy data area DDA 4 disposed in the lead-out area 103-1 in the L1 layer, the predetermined data with the lead-out area attribute (refer to a horizontal-striped hatching) is recorded.

Then, as shown in a step 2 in FIG. 18, as in the step 2 in FIG. 6 described above, for example, the record information is recorded on the basis of the layer jump recording method. Specifically, as shown in an arrow AR1 in a reversed C-shape, the record information (refer to a black hatching) is overwritten by a predetermined amount, from the inner to the outer circumferential side of the dummy data area DDA 1, and after layer jump to the L1 layer, the record information is overwritten by another predetermined amount toward the inner circumferential edge of the dummy data area DDA 3. Therefore, the dummy data area DDA 1 becomes a dummy data area DDA 1-1 which is a smaller recording area because of the overwriting of the record information on the inner circumferential side thereof. Moreover, if the record information shown in an arrow AR 1 does not reach (i.e. the recording is not performed up to) the inner circumferential edge of the DDA 3, the dummy data area DDA 3 is divided by the overwritten record information into two: a dummy data area DDA 3-1 and a dummy data area DDA 3-2.

Then, as shown by an arrow AR2 in a step 3 in FIG. 18, the predetermined data, such as the dummy data with the data area attribute, is overwritten (refer to a dotted hatching) by a predetermined amount, from the outer to the inner circumferential side of the dummy data area DDA 3-2, for example, in predetermined timing, such as at the time of background format simultaneously with the recording operation, for example. Namely, the attribute of the dummy data area DDA 3-2 is changed from the middle area attribute to the data area attribute.

Then, as shown in a step 4 in FIG. 18, substantially in the same manner as the step 2, for example, the record information is overwritten by a predetermined amount, from the inner to the outer circumferential side of the dummy data area DDA 1-1, in accordance with the direction of an arrow AR3 in a reversed C-shape, and after layer jump to the L1 layer, the record information is overwritten by another predetermined amount toward the inner circumferential edge of the dummy data area DDA 3-1. Therefore, the dummy data area DDA 1-1 becomes a dummy data area DDA 1-1-1 which is a smaller recording area because of the overwriting of the record information on the inner circumferential side thereof. Moreover, if the record information shown in an arrow AR 3 does not reach (i.e. the recording is not performed up to) the inner circumferential edge of the DDA 3-1, the dummy data area DDA 3-1 is divided by the overwritten record information into two: a dummy data area DDA 3-1-1 and a dummy data area DDA 3-1-2.

Then, as shown by an arrow AR4 in a step 5 in FIG. 18, the predetermined data, such as the dummy data with the data area attribute, is overwritten (refer to a dotted hatching) by a predetermined amount, from the outer to the inner circumferential side of the dummy data area DDA 3-1-2, for example, in predetermined timing, such as at the time of background format simultaneously with the recording operation, for example. Namely, the attribute of the dummy data area DDA 3-1-2 is changed from the middle area attribute to the data area attribute.

Then, as shown in a step 6 in FIG. 18, in the L1 layer, for example, the record information is overwritten by a predetermined amount toward the inner circumferential edge of the dummy data area DDA 3-1-2, in accordance with the direction of an arrow AR5. Therefore, the dummy data area DDA 3-1-2 becomes a dummy data area DDA 3-1-2-1 which is a smaller recording area because of the overwriting of the record information on the outer circumferential side thereof.

Lastly, as shown in a step 7 in FIG. 18, in the L0 layer, for example, buffer data for finalizing is recorded into the lead-in area 101-0 by a predetermined amount, in accordance with the direction of an arrow AR6. In particular, since the attribute of the dummy data area DDA 3-1-1 in the L1 layer is the middle area attribute, the recording of the buffer data can be omitted.

As described above, in the finalize process performed by the information recording/reproducing apparatus, for example, in the recording area where the predetermined data with the middle area attribute is recorded (i.e. the dummy data area DDA 2, etc.), it is hardly or not necessary at all to record the buffer data, such as padding data, which is mostly to set the area to a buffer state for the finalizing, for example. Therefore, it is possible to realize the finalize process, more efficiently.

(5-3) Specific Examples of Transition of Dummy Data Area—Part 3—

Figure 19:
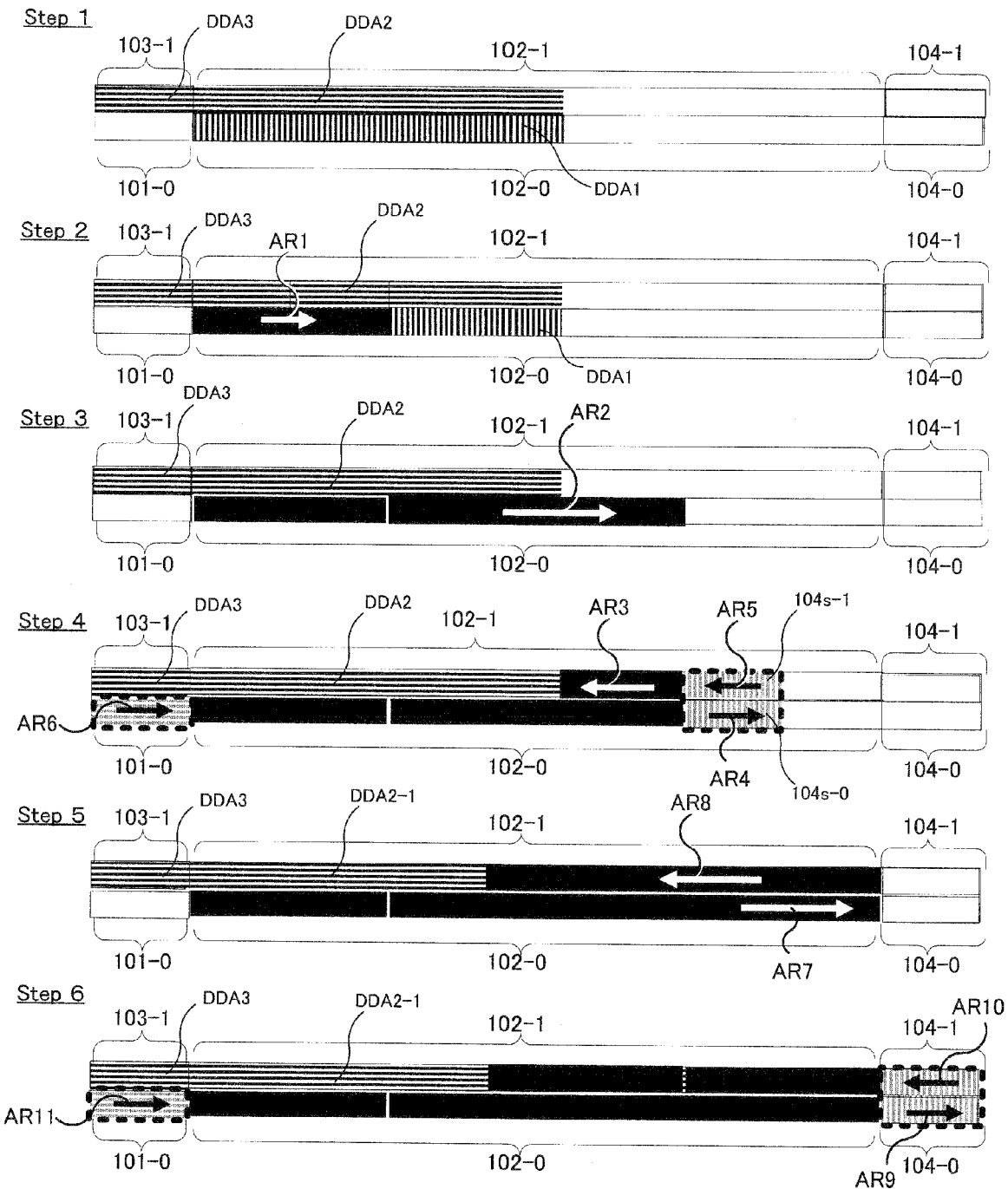
FIG. 19 is a data structure diagram showing another specific example of transition in the recording areas of the optical disc in the embodiment of the information recording medium of the present invention.

Firstly, as shown in a step 1 in FIG. 19, dummy data, which is one specific example of the predetermined data of the present invention, is recorded in predetermined timing, such as at the time of manufacturing the disc and at the time of background format simultaneously with the recording operation, for example. Specifically, in a dummy data area DDA 1 disposed in one portion of the data area 102-0 in the L0 layer, the predetermined data with the middle area attribute (refer to a vertical-striped hatching) is recorded. Moreover, in a dummy data area DDA 2 disposed in one portion of the data area 102-1 in the L1 layer, the predetermined data with the lead-out area attribute (refer to a horizontal-striped hatching) is recorded. Moreover, in a dummy data area DDA 3 disposed in the lead-out area 103-1 in the L1 layer, the predetermined data with the lead-out area attribute (refer to a horizontal-striped hatching) is recorded.

Then, as shown in a step 2 and a step 3 in FIG. 19, for example, the record information is recorded on the basis of the incremental recording method, for example. Specifically, as shown in an arrow AR1 and an arrow AR2, the record information (refer to a black hatching) is overwritten by a predetermined amount larger than the data amount of the dummy data area DDA 1, from the inner to the outer circumferential side of the dummy data area DDA 1. Therefore, the record information is overwritten into the dummy data area DDA 1. In particular, the information recording/reproducing apparatus can judge or determine that the overwriting is performed in the entire dummy data area DDA 1, on the basis of (i) the data amount of the record information, and (ii) the DR information (refer to the explanation in FIG. 4, FIG. 5, FIG. 7, and FIG. 8 described above).

Then, as shown in a step 4 in FIG. 19, for example, the record information is recorded, in accordance with the direction of an arrow AR3, in an area where there is no dummy data area DDA 2 in the L1 layer, which faces one portion on the outer circumferential side of the recording area where the record information is recorded in the L0 layer, in predetermined timing, such as at the time of background format simultaneously with the recording operation, for example. Then, for example, if the finalizing is performed, buffer data for the finalizing is recorded in the L0 layer, by a predetermined amount, in accordance with the direction of an arrow AR4, to thereby form a shifted middle area 104s-0. In the same manner, in the L1 layer, the buffer data is recorded by a predetermined amount in accordance with the direction of an arrow AR5, to thereby form a shifted middle area 104s-1. Then, in the L0 layer, the buffer data is recorded into the lead-in area 101-0 by a predetermined amount in accordance with the direction of an arrow AR6.

Then, as shown in a step 5 in FIG. 19, for example, the record information is recorded on the basis of the incremental recording method, for example, following the step 3. Specifically, as shown in an arrow AR7 and an arrow AR8, the record information (refer to a black hatching) is overwritten by a predetermined amount, up to the outer circumferential edge of the data area 102-0 in the L0 layer, and from the outer to the inner circumferential side in the L1 layer. Therefore, the dummy data area DDA 2 becomes a dummy data area DDA 2-1 which is a smaller recording area because of the overwriting of the record information on the outer circumferential side thereof.

Lastly, as shown in a step 6 in FIG. 19, for example, if the finalizing is performed, firstly, buffer data for the finalizing is recorded in the middle area 104-0 in the L0 layer, by a predetermined amount, in accordance with the direction of an arrow AR9, to thereby form a middle area 104-0. In the same manner, in the L1 layer, the buffer data is recorded by a predetermined amount, in accordance with the direction of an arrow AR10, to thereby form a middle area 104-1. Then, in the L0 layer, for example, the buffer data is recorded into the lead-in area 101-0 by a predetermined amount, in accordance with the direction of an arrow AR11.

As described above, the record information, such as the buffer data, for example, is recorded on the basis of the DR information, in predetermined timing, such as at the time of background format simultaneously with the recording operation, for example, performed by the information recording/reproducing apparatus. As a result, it is possible to more accurately and quickly perform the recording operation including the finalizing, with the above-mentioned recording order satisfied, under the incremental recording method, for example, while preventing a high load on the recording control process.

(5-4) Specific Examples of Transition of Dummy Data Area—Part 4—

Figure 20:
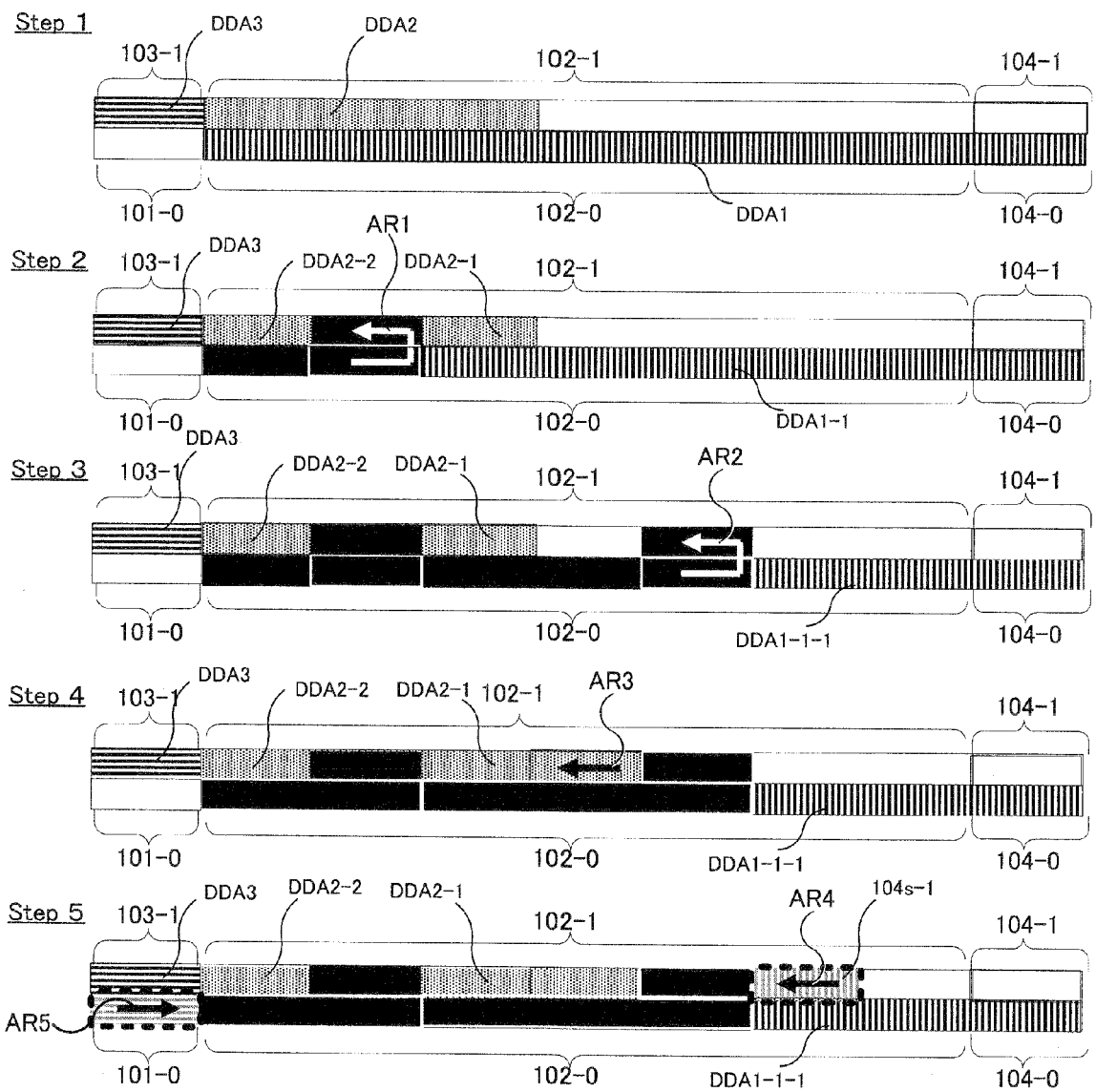
FIG. 20 is a data structure diagram showing another specific example of transition in the recording areas of the optical disc in the embodiment of the information recording medium of the present invention.

Firstly, as shown in a step 1 in FIG. 20, dummy data, which is one specific example of the predetermined data of the present invention, is recorded in predetermined timing, such as at the time of manufacturing the disc and at the time of background format simultaneously with the recording operation, for example. Specifically, in a dummy data area DDA 1 disposed in the data area 102-0 in the L0 layer and the middle area 104-0 in the L0 layer, the predetermined data with the middle area attribute (refer to a vertical-striped hatching) is recorded. Moreover, in a dummy data area DDA 2 disposed in one portion of the data area 102-1 in the L1 layer, the predetermined data with the data area attribute (refer to a dotted hatching) is recorded. Moreover, in a dummy data area DDA 3 disposed in the lead-out area 103-1 in the L1 layer, the predetermined data with the lead-out area attribute (refer to a horizontal-striped hatching) is recorded.

Then, as shown in a step 2 in FIG. 20, as in the step 2 in FIG. 6 described above, for example, the record information is recorded on the basis of the layer jump recording method. Specifically, as shown in an arrow AR1 in a reversed C-shape, the record information (refer to a black hatching) is overwritten by a predetermined amount, from the inner to the outer circumferential side of the dummy data area DDA 1, and after layer jump to the L1 layer, the record information is overwritten by another predetermined amount toward the inner circumferential edge of the dummy data area DDA 2. Therefore, the dummy data area DDA 1 becomes a dummy data area DDA 1-1 which is a smaller recording area because of the overwriting of the record information on the inner circumferential side thereof. Moreover, if the record information shown in an arrow AR 1 does not reach (i.e. the recording is not performed up to) the inner circumferential edge of the DDA 2, the dummy data area DDA 2 is divided by the overwritten record information into two: a dummy data area DDA 2-1 and a dummy data area DDA 2-2.

Then, as shown in a step 3 in FIG. 20, substantially in the same manner as the step 2, for example, the record information is overwritten by a predetermined amount, in accordance with the direction of an arrow AR2 in a reversed C-shape, from the inner to the outer circumferential side of the dummy data area DDA 1-1, and after layer jump to the L1 layer, the record information is overwritten by another predetermined amount toward the inner circumferential side, in an unrecorded area of the L1 layer. Therefore, the dummy data area DDA 1-1 becomes a dummy data area DDA 1-1-1 which is a smaller recording area because of the overwriting of the record information on the inner circumferential side thereof. In particular, the information recording/reproducing apparatus can judge or determine that it is in the unrecorded state between the dummy data area DDA 2-1 and the recording area where the recording is performed with the arrow AR2, on the basis of (i) the data amount of the record information, and (ii) the DR information (refer to the explanation in FIG. 4 and the like described above).

Then, as shown by an arrow AR3 in a step 4 in FIG. 20, the predetermined data, such as the dummy data with the data area attribute, is overwritten (refer to a dotted hatching) by a predetermined amount, in an unrecorded area located on the outer circumferential side of the dummy data area DDA 2-1, for example, in predetermined timing, such as at the time of background format simultaneously with the recording operation, for example.

Lastly, as shown in a step 5 in FIG. 20, if the finalizing is performed, in the L1 layer, buffer data for the finalizing is recorded by a predetermined amount, in accordance with the direction of an arrow AR4, to thereby form a shifted middle area 104s-0. Then, in the L0 layer, the buffer data is recorded into the lead-in area 101-0 by a predetermined amount, in accordance with the direction of an arrow AR5. In particular, since the attribute of the dummy data area DDA 1-1-1 in the L0 layer is the middle area attribute, the recording of the buffer data can be omitted.

As described above, in the finalize process performed by the information recording/reproducing apparatus, for example, in the recording area where the predetermined data with the middle area attribute is recorded (i.e. the dummy data area DDA 1-1-1, etc.), it is hardly or not necessary at all to record the buffer data, such as padding data, which is mostly to set the area to a buffer state for the finalizing, for example. Therefore, it is possible to realize the finalize process, more efficiently.

In addition, the record information, such as the buffer data, for example, is recorded on the basis of the DR information, in predetermined timing, such as at the time of background format simultaneously with the recording operation, for example, performed by the information recording/reproducing apparatus. As a result, it is possible to more accurately and quickly perform the recording operation including the finalizing, with the above-mentioned recording order satisfied, under the incremental recording method, for example, while preventing a high load on the recording control process.

(5-5) Specific Examples of Transition of Dummy Data Area—Part 5—

Firstly, as shown in a step 1 in FIG. 21, dummy data, which is one specific example of the predetermined data of the present invention, is recorded in predetermined timing, such as at the time of manufacturing the disc and at the time of background format simultaneously with the recording operation, for example. Specifically, in a dummy data area DDA 1 disposed in one portion on the inner circumferential side of the data area 102-0 in the L0 layer, the predetermined data with the middle area attribute (refer to a vertical-striped hatching) is recorded. Moreover, in a dummy data area DDA 2 disposed in one portion on the outer circumferential side of the data area 102-0 in the L0 layer, the predetermined data with the middle area attribute (refer to a vertical-striped hatching) is recorded in the same manner.

Then, as shown in a step 2 in FIG. 21, for example, the record information is recorded on the basis of the random write method, for example. Specifically, as shown in an arrow AR1, the record information (refer to a black hatching) is overwritten by a predetermined amount, toward the outer circumferential side from the outer circumferential edge of the dummy data area DDA 1. Therefore, the dummy data area DDA 1 becomes a dummy data area DDA 1-1 which is a smaller recording area because of the recording of the record information in one portion of the recording area thereof.

In particular, the information recording/reproducing apparatus can judge or determine that the outer circumferential edge of the dummy data area DDA 1 is changed, on the basis of (i) the recording position of the record information, and (ii) the DR information (refer to the explanation in FIG. 4 and the like described above). Therefore, the information recording/reproducing apparatus can judge or determine that it can perform the recording operation, with the recording order satisfied, in the recording areas of data area 102a-1 and data area 102b-1, surrounded in dashed lines, in the step 3 in FIG. 21.

Then, as shown in a step 4 in FIG. 21, for example, the record information is recorded on the basis of the random write method, for example. Specifically, as shown in an arrow AR2, the record information (refer to a black hatching) is overwritten by a predetermined amount, from the inner to the outer circumferential side of the dummy data area DDA 2. Therefore, the dummy data area DDA 2 becomes a dummy data area DDA 2-1 which is a smaller recording area because of the recording of the record information in one portion of the recording area thereof.

Even in this case, the information recording/reproducing apparatus can judge or determine that the inner circumferential edge of the dummy data area DDA 2 is changed, on the basis of (i) the recording position of the record information, and (ii) the DR information (refer to the explanation in FIG. 4 and the like described above). Therefore, the information recording/reproducing apparatus can judge or determine that it can perform the recording operation, with the recording order satisfied, in the recording area of data area 102c-1 in addition to the above-mentioned data area 102a-1, surrounded in dashed lines, in the step 4 in FIG. 21.

According to the above-mentioned embodiments, on the information recording medium, such as the optical disc, the record information can be recorded in the L0 layer and the L1 layer, wherein the record information including the predetermined data, such as the dummy data, capable of setting the layer close to the physically or optically recorded state. In addition, in the recording management area provided for at least one of the L0 layer and the L1 layer, the management information, such as the DR (Dummy Recording) information, can be recorded. The DR information includes at least one of (i) the position information about the position of the dummy data area where the dummy data can be recorded, and (ii) the attribute information about the attribute of the dummy data area.

Therefore, it is possible to receive the following two effects.

As a first effect, it is possible to enable the information recording apparatus to perform the recording operation including the random write, for example, which satisfies the above-mentioned recording operation, more accurately and quickly, while preventing a high load on the recording control process. Moreover, as a second effect, since a time length for the finalize process performed on the information recording medium is substantially the same as a recording time length of recording the effective record information, such as the content information, for example. Thus, it is possible to realize great reduction and more efficient reduction in the time length for the finalize process, which enables the user to feel greater comfort in the finalize process.

In the above-mentioned embodiments, an explanation was given for a single layer type or two layer type optical disc on which recording or reproduction can be performed by using laser light, such as blue ray, red LD light, and infrared light, as one specific example of the information recording medium. In addition, the present invention can be also applied to a multilayer type (multiple layer type) optical disc provided with three or more recording layers, for example. Moreover, it can be also applied to other various information recording media supporting high-density recording or high transfer rate.

Moreover, in the above-mentioned embodiment, an explanation was given for the information recording/reproducing apparatus compatible with the two layer type optical disc, for example, as one specific example of the information recording apparatus and the information reproducing apparatus. In addition, the present invention can be also applied to an information recording/reproducing apparatus compatible with a multilayer type (multiple layer type) optical disc provided with three or more recording layers, for example. Moreover, it can be also applied to an information recording/reproducing apparatus compatible with other various information recording media supporting high-density recording or high transfer rate.

The present invention is not limited to the above-described embodiment, and various changes may be made, if desired, without departing from the essence or spirit of the invention which can be read from the claims and the entire specification. An information recording medium, an information recording apparatus and method, an information reproducing apparatus and method, and a computer program, all of which involve such changes, are also intended to be within the technical scope of the present invention.

INDUSTRIAL APPLICABILITY

The information recording medium, the information recording apparatus and method, the information reproducing apparatus and method, and the computer program according to the present invention can be applied to an information recording medium, such as a DVD, a BD, and a CD, and can be further applied to an information recording apparatus, an information reproducing apparatus or the like, such as a DVD recorder or player. Moreover, they can be applied to an information recording apparatus, an information reproducing apparatus, or the like, which is mounted on various computer equipment for consumer use or for business use, or which can be connected to various computer equipment.

The invention claimed is:

1. An information recording medium, at least comprising:
   a first recording layer in which dummy data including area attribute information as for an attribute of a data recording area can be recorded; and
   a second recording layer in which the dummy data can be recorded by laser light transmitted through said first recording layer,
   at least one of said first recording layer and said second recording layer comprising a management area in which management information can be recorded, the management information including (i) position information as for a position of a dummy data recording area in which the dummy data is recorded, and (ii) attribute information as for an attribute of the dummy data recording area, wherein
   the attribute of the dummy data recording area is the same as that of a data area, and
   zero or a predetermined value is recorded into the dummy data recording area.

2. The information recording medium according to claim 1, wherein the management information includes, as the position information, (i) a start address indicating a start position of the dummy data recording area, and (ii-1) an end address indicating an end position of the dummy data recording area or (ii-2) information as for a recording capacity of the dummy data.

3. The information recording medium according to claim 1, wherein the management information includes the position information, and the attribute information.

4. The information recording medium according to claim 1, wherein the management information further includes identification information indicating whether or not there is the dummy data recording area.

5. An information recording apparatus for recording record information onto an information recording medium, at least comprising: a first recording layer in which dummy data including area attribute information as for an attribute of a data recording area can be recorded; and a second recording layer in which the dummy data can be recorded by laser light transmitted through said first recording layer, at least one of said first recording layer and said second recording layer comprising a management area in which management information can be recorded, the management information including (i) position information as for a position of a dummy data recording area in which the dummy data is recorded, and (ii) attribute information as for an attribute of the dummy data recording area,
   said information recording apparatus comprising:
   a first recording device for recording zero or a predetermined value with the same attribute as that of a data area, into the dummy data recording area; and
   a second recording device for recording the management information corresponding to the dummy data recording area.

6. An information reproducing apparatus for reproducing record information from an information recording medium, at least comprising: a first recording layer in which dummy data including area attribute information as for an attribute of a data recording area can be recorded; and a second recording layer in which the dummy data can be recorded by laser light transmitted through said first recording layer, at least one of said first recording layer and said second recording layer comprising a management area in which management information can be recorded, the management information including (i) position information as for a position of a dummy data recording area in which the dummy data is recorded, and (ii) attribute information as for an attribute of the dummy data recording area, wherein the attribute of the dummy data recording area is the same as that of a data area, and zero or a predetermined value is recorded into the dummy data recording area,
   said information reproducing apparatus comprising:
   an obtaining device for obtaining the management information;
   a reproducing device for reproducing the record information; and
   a controlling device for controlling said reproducing device to reproduce the record information on the basis of the obtained management information.

7. An information recording method in an information recording apparatus comprising a recording device for recording record information onto an information recording medium, at least comprising: a first recording layer in which dummy data including area attribute information as for an attribute of a data recording area can be recorded; and a second recording layer in which the dummy data can be recorded by laser light transmitted through said first recording layer, at least one of said first recording layer and said second recording layer comprising a management area in which management information can be recorded, the management information including (i) position information as for a position of a dummy data recording area in which the dummy data is recorded, and (ii) attribute information as for an attribute of the dummy data recording area,
   said information recording method comprising:
   a first recording process of recording zero or a predetermined value with the same attribute as that of a data area, into the dummy data recording area; and a second recording process of recording the management information corresponding to the dummy data recording area.

8. An information reproducing method in an information reproducing apparatus comprising a reproducing device for reproducing record information from an information recording medium, at least comprising: a first recording layer in which dummy data including area attribute information as for an attribute of a data recording area can be recorded; and a second recording layer in which the dummy data can be recorded by laser light transmitted through said first recording layer, at least one of said first recording layer and said second recording layer comprising a management area in which management information can be recorded, the management information including (i) position information as for a position of a dummy data recording area in which the dummy data is recorded, and (ii) attribute information as for an attribute of the dummy data recording area, wherein the attribute of the dummy data recording area is the same as that of a data area, and zero or a predetermined value is recorded into the dummy data recording area, said information reproducing method comprising:

an obtaining process of obtaining the management information;

a reproducing process of reproducing the record information; and a controlling process of controlling said reproducing device to reproduce the record information on the basis of the obtained management information.

* * * * *